United States Patent
Ooi et al.

(10) Patent No.: US 7,616,893 B2
(45) Date of Patent: Nov. 10, 2009

(54) WAVELENGTH DIVISION MULTIPLEXING OPTICAL REPEATING TRANSMISSION METHOD AND REPEATING APPARATUS

(75) Inventors: Hiroki Ooi, Kawasaki (JP); Takashi Iwabuchi, Sopporo (JP); Takafumi Terahara, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 612 days.

(21) Appl. No.: 10/781,783

(22) Filed: Feb. 20, 2004

(65) Prior Publication Data

US 2004/0184814 A1 Sep. 23, 2004

(30) Foreign Application Priority Data

Mar. 3, 2003 (JP) .............................. 2003-055353

(51) Int. Cl.
H04J 14/02 (2006.01)
(52) U.S. Cl. ........................................ 398/81; 398/147
(58) Field of Classification Search ................... 398/81, 398/147–150, 159
See application file for complete search history.

(56) References Cited

U.S. PATENT DOCUMENTS

| | | | |
|---|---|---|---|
| 5,559,920 A * | 9/1996 | Chraplyvy et al. .......... | 385/123 |
| 5,717,510 A | 2/1998 | Ishikawa et al. | |
| 5,877,879 A | 3/1999 | Naito | |
| 6,229,935 B1 | 5/2001 | Jones et al. | |
| 6,278,536 B1 | 8/2001 | Kai et al. | |
| 6,320,687 B1 | 11/2001 | Ishikawa | |
| 6,351,323 B1 | 2/2002 | Onaka et al. | |
| 6,411,416 B1 | 6/2002 | Ooi et al. | |
| 6,433,923 B2 * | 8/2002 | Tanaka et al. ................ | 359/337 |
| 6,538,782 B1 | 3/2003 | Otsuka et al. | |
| 6,563,978 B2 * | 5/2003 | Matsuoka et al. ............. | 385/24 |
| 6,594,428 B1 | 7/2003 | Tanaka et al. | |

(Continued)

FOREIGN PATENT DOCUMENTS

CN 2517184 Y 10/2002

(Continued)

OTHER PUBLICATIONS

Ramaswami, R. and K.N. Sivarajan. Optical Networks: A Practial Perspective. 2nd ed. San Francisco: Morgan Kaufmann Publishers, 2002.*

(Continued)

*Primary Examiner*—Leslie Pascal
(74) *Attorney, Agent, or Firm*—Staas & Halsey LLP

(57) ABSTRACT

A repeating apparatus disposed at an end point of each divisional repeating interval of a light transmission line performs a first dispersion compensation step, an optical add/drop multiplexing step and a second dispersion compensation step to perform repeating transmission. The ratio of an over compensation amount at the second dispersion compensation step to the sum of dispersion compensation amounts at the first and second dispersion compensation steps is set so as to gradually vary together with the transmission distance from the terminal apparatus for transmission at which the repeating apparatus is disposed on the light transmission line so that degradation of wavelengths to be received by the terminal apparatus for reception is suppressed while dispersion compensation is performed with a high degree of accuracy at each optical add/drop multiplexing point on the transmission line.

9 Claims, 20 Drawing Sheets

U.S. PATENT DOCUMENTS

| | | | |
|---|---|---|---|
| 6,650,842 B1 * | 11/2003 | Fee et al. | ............ 398/147 |
| 6,661,974 B1 | 12/2003 | Akiyama et al. | |
| 6,754,420 B2 | 6/2004 | Tsuritani et al. | |
| 6,931,176 B2 * | 8/2005 | Kelly | ............ 385/24 |
| 2001/0030797 A1 | 10/2001 | Hosaka et al. | |
| 2001/0046077 A1 | 11/2001 | Akiyama et al. | |
| 2002/0015207 A1 | 2/2002 | Ooi et al. | |
| 2002/0021862 A1 * | 2/2002 | Zhou et al. | ............ 385/24 |
| 2002/0131711 A1 | 9/2002 | Tanaka et al. | |
| 2003/0007217 A1 * | 1/2003 | Fuerst et al. | ............ 359/161 |
| 2004/0028319 A1 * | 2/2004 | Ajgaonkar et al. | ............ 385/16 |
| 2004/0208608 A1 * | 10/2004 | Tager et al. | ............ 398/147 |
| 2004/0208617 A1 * | 10/2004 | Essiambre et al. | ............ 398/158 |

FOREIGN PATENT DOCUMENTS

| | | |
|---|---|---|
| EP | 0 902560 A2 | 3/1999 |
| EP | 0 924 884 | 6/1999 |
| GB | 2 330 026 | 4/1999 |
| JP | HEI 8-321805 | 12/1996 |
| JP | 9-46318 | 2/1997 |
| JP | HEI 9-153859 | 6/1997 |
| JP | HEI 11-68657 | 3/1999 |
| JP | HEI 11-88260 | 3/1999 |
| JP | HEI 11-88261 | 3/1999 |
| JP | 11-103286 | 4/1999 |
| JP | 11-127121 | 5/1999 |
| JP | 11-186960 | 7/1999 |
| JP | 11-218790 | 8/1999 |
| JP | 11-289296 | 10/1999 |
| JP | 11-331074 | 11/1999 |
| JP | 2000-68931 | 3/2000 |
| JP | 2000-502848 | 3/2000 |
| JP | 2000-236299 | 8/2000 |
| JP | 2000-261377 | 9/2000 |
| JP | 2000-357994 | 12/2000 |
| JP | 2001-268056 | 9/2001 |
| JP | 2001-339345 | 12/2001 |
| JP | 2002-57622 | 2/2002 |
| JP | 2002-77053 | 3/2002 |
| JP | 2002-158636 | 5/2002 |
| JP | 2002-232355 | 8/2002 |
| JP | 2002-280959 | 9/2002 |
| JP | 2003-298516 | 10/2003 |
| WO | WO99/28723 | 6/1999 |
| WO | WO 02/21173 | 3/2002 |

OTHER PUBLICATIONS

M. Shirasaki, et al., "Variable Dispersion Compensator Using the Virtually Imaged Phased Array (VIPA) for 40-GBIT/S WDM Transmission Systems", ECOC 2000, 26th European Conference on Optical Communication, Proceedings, vol. 5, Plenary Papers and Tutorials Post-Deadline Papers, Sep. 3, 2000.

J.A.J. Fells, et al., "Twin Fibre Grating Adjustable Dispersion Compensator for 40 GBIT/S," ECOC 2000, 26th European Conference on Optical Communication, Proceedings, vol. 5, Plenary Papers and Tutorials Post-Deadline Papers, Sep. 3, 2000.

U.S. Appl. No. 09/359,112, filed Jul. 23, 1999, Hiroki Ooi, et al., Fujitsu Limited.

China Patent Office Action issued Jul. 14, 2006 for corresponding Chinese Patent Application No. 200410003188.1.

Japanese Patent Office Action, mailed Jan. 22, 2008 and issued in corresponding Japanese Patent Application No. 2003-055353.

S.R. Bickam, et al. "Dispersion Map for Slope Compensating Fibers"—Published Japanese Translation of PCT International Application, No. 2004-523141, Jul. 2004.

Japanese Patent Office Notice of Reasons for Rejection, mailed Mar. 3, 2009 and issued in corresponding Japanese Patent Application No. 2003-055353, Mar. 2009.

* cited by examiner

R.D. (Residual dispersion): RESIDUAL DISPERSION

DCT=0  DCL=100%  R.D=0

DCT=0  DCL=114%  R.D=0

WAVELENGTH DIVISION MULTIPLEXING OPTICAL REPEATING TRANSMISSION METHOD AND REPEATING APPARATUS

BACKGROUND OF THE INVENTION

1) Field of the Invention

The present invention relates to a wavelength division multiplexing optical repeating transmission method and a repeating apparatus suitable for use with an optical communication system.

2) Description of the Related Art

In recent years, due to drastic increase of the use of communication networks, a demand for further increase of the network capacity is increasing. Also in optical communication systems, it is expected that the capacity, speed and distance increase more than those of systems available at present in order to satisfy the demand for increase of the network capacity.

In the present situation, practical use of a wavelength division multiplexing (WDM) optical transmission system based on the transmission speed per one channel of 10 Gbit/s (gigabit/second) has been started. In the future, a very high-speed transmission system having a transmission speed of 40 Gbit/s or more per one channel is demanded from the point of view of the demand for further increase of the capacity, the frequency utilization efficiency and the cost.

Particularly in recent years, it is demanded to multi-functionalize an optical network system. Thus, not only a point-to-point transmission function but also functions for freely changing over the path of an optical signal such as an optical add/drop multiplexing (OADM) function and an optical cross-connect (OXC) function are demanded.

Incidentally, since the refractive index of an optical fiber varies depending upon the wavelength, even if the same fiber is used, the propagation time (speed) of light differs among difference wavelengths. This phenomenon is called chromatic dispersion. In the very high-speed transmission system, in order to cope with the multi-functionalization of a network system together with such increase of the capacity described above, it is necessary to optimally compensate for the dispersion of a transmission line to optimally compensate for waveform degradation with a high degree of accuracy.

It is to be noted that the following documents disclose techniques relating to the invention of the present application.

Patent document 1:
Japanese Patent Laid-Open No. 2000-68931
Patent document 2:
U.S. Pat. No. 6,229,935

Incidentally, in an optical transmission system having the transmission speed of 40 Gbit/s or more which is demanded for the very high-speed transmission system described above, the chromatic dispersion tolerance is very small. For example, where a wavelength division multiplexed optical signal is transmitted using the NRZ (Non Return to Zero) method of the transmission speed of 40 Gbit/s, the chromatic dispersion tolerance is less than approximately 70 ps/nm (picosecond/nanometer) which is 1/16 that of a 10 Gbit/s system.

Meanwhile, the chromatic dispersion of a transmission line fiber involves such factors of variation as the difference of the length of the transmission line, the dispersion in manufacture of the chromatic dispersion coefficient and the dispersion slope coefficient of the transmission line fiber and the dispersion compensating fiber (DCF), and the temperature variation of the fiber zero-dispersion wavelength. In order to achieve long distance transmission by a very high-speed wavelength division multiplexing transmission system, it is a significant subject to make it possible to absorb the dispersion variation and suppress degradation of a reception waveform in a reception side terminal apparatus while dispersion compensation is performed with a high degree of accuracy at an add/drop point on an optical transmission line.

SUMMARY OF THE INVENTION

It is an object of the present invention to provide a wavelength division multiplexing optical transmission method and a repeating apparatus by which degradation of a reception waveform in a reception side terminal apparatus can be suppressed while dispersion compensation is performed with a high degree of accuracy at an add/drop point on an optical transmission line.

In order to attain the object described above, according to an aspect of the present invention, there is provided a wavelength division multiplexing optical repeating transmission method for performing repeating transmission of a wavelength multiplexed optical signal along an optical transmission line interconnecting a terminal apparatus for transmission and a terminal apparatus for reception and having a repeating interval divided by a plurality of repeating apparatus, comprising steps executed by each of the repeating apparatus disposed at end points of the divisional repeating intervals, the steps including a first dispersion compensation step of compensating for a dispersion included in the wavelength multiplexed optical signal having propagated in the divisional repeating interval on the terminal apparatus side for transmission so as to be included within a tolerance set in advance, an optical add/drop multiplexing step of performing an optical add/drop multiplexing process for each of wavelength components of the wavelength multiplexed optical signal for which the dispersion compensation process has been performed at the first dispersion compensation step, and a second dispersion compensation step of performing a dispersion compensation process with an over compensation amount for the wavelength multiplexed optical signal for which the optical add/drop multiplexing process has been performed at the optical add/drop multiplexing step such that the sum of the compensation amount at the second dispersion compensation step and the compensation amount at the first dispersion compensation step exhibits a predetermined proportion to the dispersion appearing in the divisional repeating interval on the terminal apparatus side for transmission and transmitting a resulting signal to the divisional repeating interval on the terminal apparatus side for reception, the ratio of the over compensation amount at the second dispersion compensation step to the sum of the dispersion compensation amounts at the first and second dispersion compensation steps being set so as to gradually vary together with the transmission distance from the terminal apparatus for transmission at which the repeating apparatus is disposed on the light transmission line.

Preferably, the predetermined proportion for performing the dispersion compensation process by the over compensation amount at the second dispersion compensation step is set so as to gradually increase or decrease together with the transmission distance from the terminal apparatus for transmission at which of the repeating apparatus is disposed on the light transmission line.

The wavelength division multiplexing optical repeating transmission method may further comprise a residual dispersion compensation step executed by each of the repeating apparatus of compensating, where a residual dispersion appears in an optical signal of each wavelength before and after the optical add/drop multiplexing process at the optical add/drop multiplexing step, for the residual dispersion.

The wavelength division multiplexing optical repeating transmission method may further comprise a dispersion compensation step of performing a dispersion compensation process which satisfies a transmission condition for a wavelength multiplexed optical signal to be transmitted in the terminal apparatus for transmission. In this instance, preferably the transmission condition relates to at least one of the kind of fiber, the transmission distance and the bit rate.

According to another aspect of the present invention, there is provided a repeating apparatus for a wavelength division multiplexing optical repeating transmission system wherein a terminal apparatus for transmission and a terminal apparatus for reception are interconnected by an optical transmission line whose repeating interval is divided by a plurality of repeating apparatus to perform repeating transmission of a wavelength multiplexed optical signal, comprising a first dispersion compensation section for compensating for a dispersion included in the wavelength multiplexed optical signal having propagated in the divisional repeating interval on the terminal apparatus side for transmission so as to be included within a tolerance set in advance, an optical add/drop multiplexing section for performing an optical add/drop multiplexing process for each of wavelength components of the wavelength multiplexed optical signal for which the dispersion compensation process has been performed in the first dispersion compensation section, and a second dispersion compensation section for performing a dispersion compensation process with an over compensation amount for the wavelength multiplexed optical signal for which the optical add/drop multiplexing process has been performed by the optical add/drop multiplexing section such that the sum of the compensation amount by the second dispersion compensation section and the compensation amount by the first dispersion compensation section exhibits a predetermined proportion to the dispersion appearing in the divisional repeating interval on the terminal apparatus side for transmission.

Preferably, the second dispersion compensation section gradually increases or decreases the predetermined proportion for performing the dispersion compensation process by the over compensation amount together with the transmission distance from the terminal apparatus for transmission at which the repeating apparatus is disposed on the light transmission line.

At least one of the first and second dispersion compensation sections may be formed from a variable dispersion compensation apparatus which can vary a set value for a dispersion compensation amount.

The repeating apparatus may further comprise a dispersion slope compensation apparatus for compensating for a dispersion slope regarding a wavelength multiplexed optical signal to be inputted to the optical add/drop multiplexing section or a wavelength multiplexed optical signal outputted from the optical add/drop multiplexing section of a different one of the plural repeating apparatus.

The repeating apparatus may further comprise a dispersion compensator for compensating for a residual dispersion amount with respect to a dispersion compensation amount in the first or second dispersion compensation section for each optical signal of an individual channel added/dropped by the optical add/drop multiplexing section.

In the wavelength division multiplexing optical repeating transmission method and the repeating apparatus of the present invention, after the first dispersion compensation section compensates for a dispersion included in a wavelength multiplexed optical signal having propagated in a divisional repeating interval on the terminal apparatus side for transmission so as to be included within a tolerance set in advance (first dispersion compensation step), an optical add/drop multiplexing process can be performed for each of wavelength components of the wavelength multiplexed optical signal (optical add/drop multiplexing step). Therefore, the chromatic dispersion of those optical signals to be received by a local station can be optimized to improve the characteristic of the reception optical signals. Further, the ratio of the over compensation amount at the second dispersion compensation step to the sum of the dispersion compensation amounts at the first and second dispersion compensation steps can be set so as to gradually vary (increase or decrease) together with the transmission distance from the terminal apparatus for transmission at which the repeating apparatus is disposed on the light transmission line. Therefore, the wavelength degradation of the optical signals of individual wavelengths to be received by the terminal apparatus for reception can be compensated for optimally.

Further, where a residual dispersion appears in an optical signal of each wavelength before and after the optical add/drop multiplexing process at the optical add/drop multiplexing step, the residual dispersion can be compensated for at the residual dispersion compensation step. Consequently, there is an advantage that cumulative increase of the residual dispersion slope together with increase of the transmission distance can be prevented. Further, there is another advantage that a displacement of the dispersion amounts between optical signals to be inputted from a local station to a repeating apparatus can be adjusted together with the displacement of the dispersion amount between optical signals of different wavelengths to be signaled from the repeating apparatus to the local station.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

In the following, embodiments of the present invention are described with reference to the drawings.

[A] First Embodiment

Figure 1:
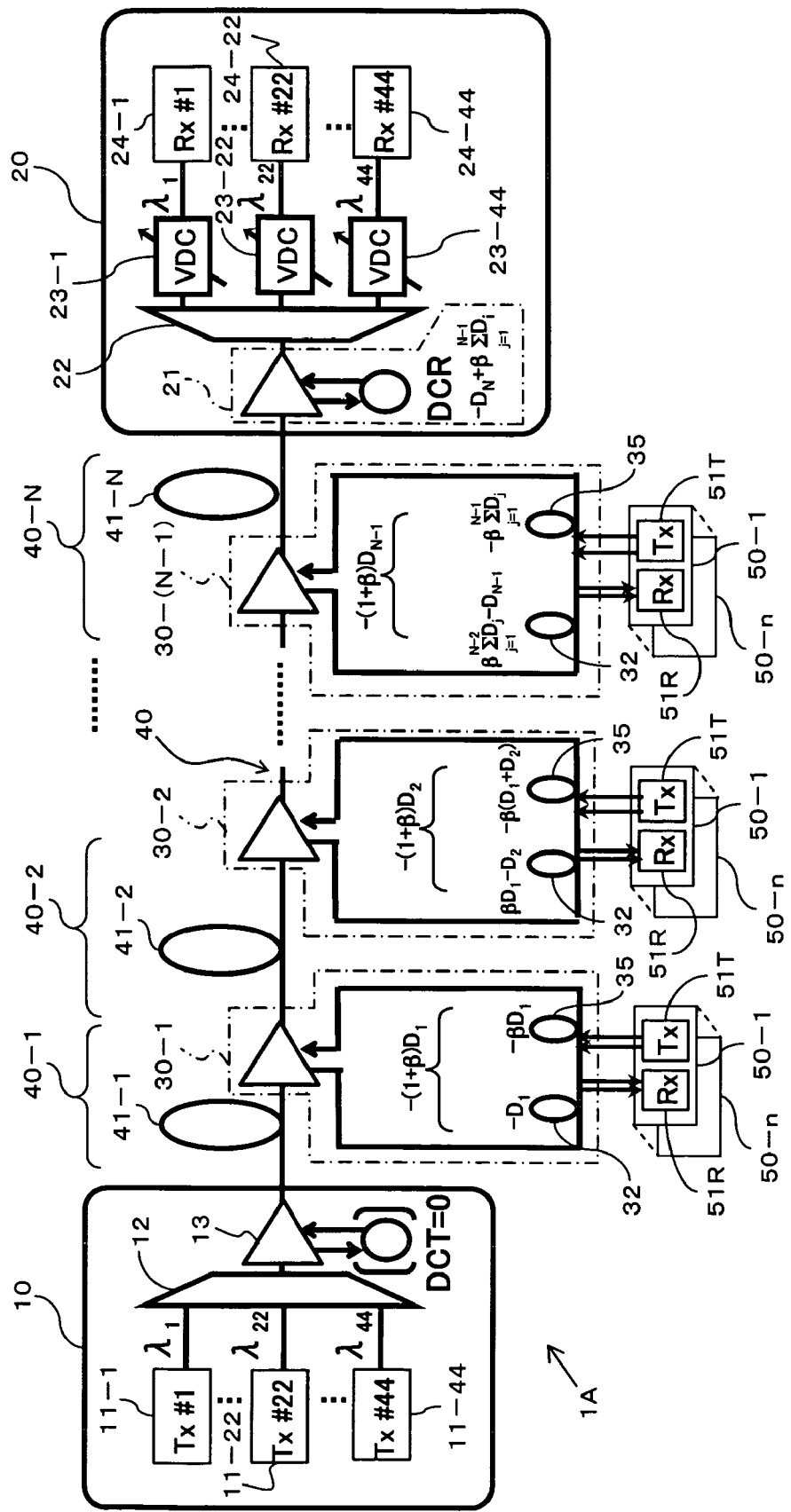
FIG. 1 is a block diagram showing a wavelength division multiplexing optical repeating transmission system according to a first embodiment of the present invention.

FIG. 1 is a block diagram showing a wavelength division multiplexing optical repeating transmission system 1A according to a first embodiment of the present invention. Referring to FIG. 1, in the wavelength division multiplexing optical repeating transmission system 1A shown, a terminal apparatus 10 for transmission and a terminal apparatus 20 for reception are interconnected by an optical transmission line 40. The wavelength division multiplexing optical repeating transmission system 1A performs repeating transmission of a wavelength division multiplexed optical signal of, for example, 40 Gbit/s per one wave. The optical transmission line 40 is divided into N repeating intervals 40-1 to 40-N by N−1 repeating apparatus 30-1 to 30-(N−1).

Further, the wavelength division multiplexing optical repeating transmission system 1A can perform an add/drop multiplexing process of an optical signal of each wavelength component in a transmission unit of each of the repeating intervals 40-1 to 40-N described above and transmit a wavelength division multiplexed optical signal.

Here, the repeating apparatus 30-1 to 30-(N−1) have a function for performing an add/drop multiplexing process for a wavelength division multiplexed optical signal as inline repeating sections positioned at end points (end points on the transmission side or the reception side) of the repeating interval 40-1 to 40-N. It is to be noted that the repeating apparatus 30-1 to 30-(N−1) have a characteristic configuration of the present invention hereinafter described.

The repeating interval 40-1 is an interval connected by an optical fiber 41-1 between the optical transmission terminal apparatus 10 and the repeating apparatus 30-1. The repeating intervals 40-2 to 40-(N−1) are intervals connected by optical fibers 41-2 to 41-(N−1) between the repeating apparatus 30-1 to 30-(N−1) adjacent to each other, respectively. The repeating interval 40-N is an interval connected by an optical fiber 41-N between the repeating apparatus 30-(N−1) and the optical terminal apparatus 20 for reception.

The terminal apparatus 10 for transmission includes a plurality of (44 in the case shown) optical transmission sections 11-1 to 11-44, a multiplexer 12 and an amplifier 13. The forty-four optical transmission sections (Tx#1 to Tx#44) 11-1 to 11-44 output optical signals having wavelengths $\lambda_1$ to $\lambda_{44}$ different from one another, respectively. In other words, forty-four different optical signals having wavelengths different from one another can be outputted from the forty-four signal light sources 11-1 to 11-44.

The multiplexer 12 performs a wavelength division multiplexing process for the forty-four optical signals having wavelengths different from one another and outputs a resulting signal. The amplifier 13 amplifies and transmits the wavelength division multiplexed optical signal from the multiplexer 12 to the optical transmission line 40. It is to be noted that, while it is possible to provide a dispersion compensation function to the amplifier 13, in the first embodiment, a dispersion compensation process is not performed in the terminal apparatus 10 for transmission (compensation amount DCT=0).

Figure 2:
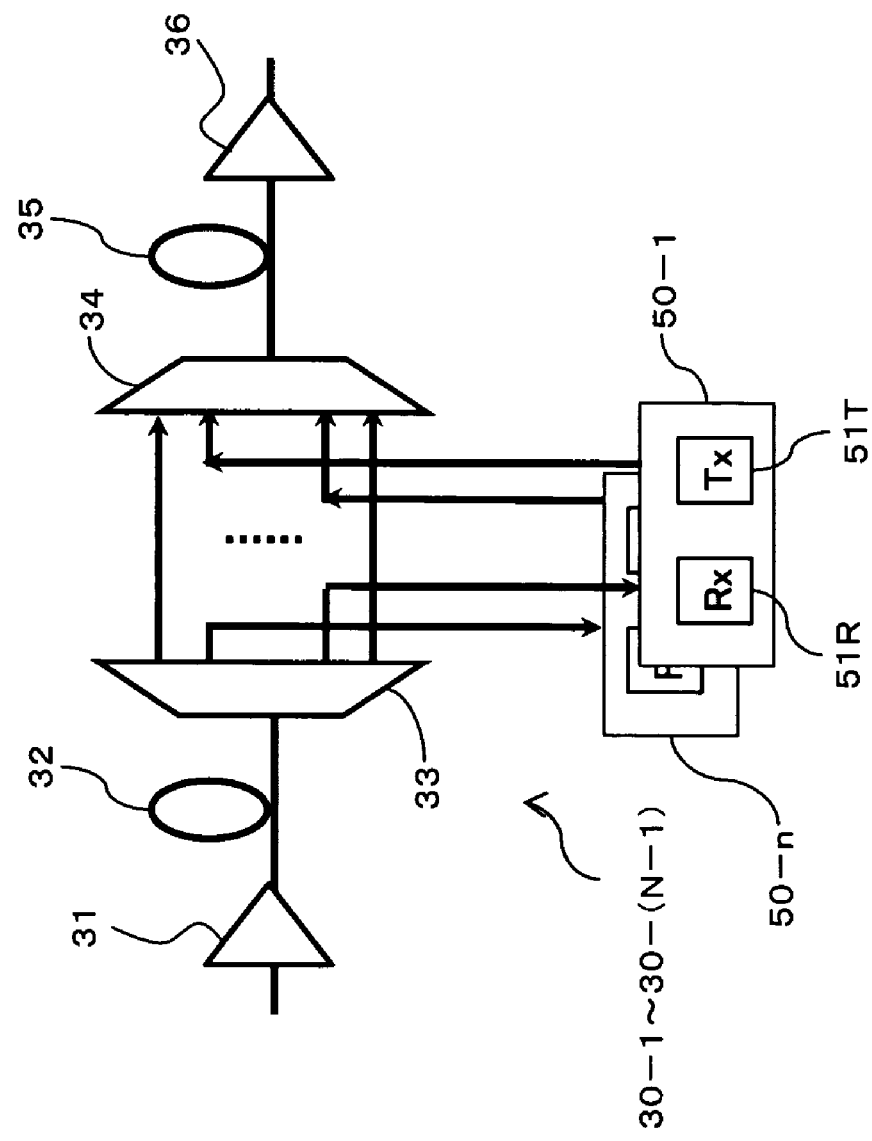
FIG. 2 is a block diagram showing part of a repeating apparatus according to the first embodiment of the present invention.

The repeating apparatus 30-1 to 30-(N−1) individually include an amplifier 31, a first dispersion compensator 32, an optical demultiplexer 33, an optical multiplexer 34, a second dispersion compensator 35 and an amplifier 36 as shown in FIG. 2. It is to be noted that, in FIG. 2, the components of the repeating apparatus 30-1 to 30-(N−1) are denoted by common reference numerals 31 to 36. Further, components also of local stations connected to the repeating apparatus 30-1 to 30-(N−1) are denoted by common reference characters 51-1 to 51-n.

The amplifier 31 amplifies a wavelength division multiplexed optical signal transmitted through the repeating interval (where the repeating point is the repeating apparatus 30-1, the repeating interval 40-1) on the terminal apparatus 10 side for transmission.

The first dispersion compensator 32 is formed from, for example, a dispersion compensation fiber (DCF) or the like and optimally compensates for chromatic dispersion regarding the wavelength division multiplexed optical signal from the amplifier 31. Further, the first dispersion compensator 32 can be formed from, for example, such a dispersion compensation fiber (DCF) which can perform dispersion compensation with a compensation amount suitable for the repeating apparatus 30-1 to 30-(N−1) as hereinafter described.

Further, the first dispersion compensator 32 performs the dispersion compensation process with a compensation amount DCLa for suppressing the dispersion in a wavelength of an intermediate waveband ($\lambda_{22}$ in $\lambda_1$ to $\lambda_{44}$ disposed for the individual wavelengths) which forms a wavelength division multiplexed optical signal to a dispersion tolerance or less [for example, 0 (zero)]. Consequently, an optical signal for which a wavelength division demultiplexing process is to be performed by the optical demultiplexer 33 hereinafter described and outputted to a local station 50-1 to 50-n has a dispersion amount optimally compensated for and has waveform degradation compensated for.

Accordingly, the first dispersion compensator 32 described above functions as a first dispersion compensation section for compensating for the dispersion which appears in the optical transmission line in the repeating interval on the terminal apparatus 10 for transmission side so as to be included within a tolerance set in advance.

The optical demultiplexer 33 performs a wavelength division demultiplexing process for a wavelength division multiplexed optical signal having dispersion compensated for by the first dispersion compensator 32, and outputs resulting signals to the optical multiplexer 34 or reception sections 51R of the local stations 50-1 to 50-n depending upon the demultiplexed wavelength components. In particular, from among the optical signals obtained by the wavelength division demultiplexing process performed by the optical demultiplexer 33, an optical signal allocated as a reception signal wavelength for each of the local stations 50-1 to 50-n is outputted to the reception section 51R of the local station 50-1 to 50-n (dropping multiplexing process) while each optical signal having any other wavelength than the reception signal wavelengths just described is outputted to the optical multiplexer 34.

The optical multiplexer 34 performs a wavelength division multiplexing process for the optical signals from the optical demultiplexer 33 and the optical signals (optical signals whose wavelengths are allocated individually to the local stations 50-1 to 50-n) outputted from transmission sections 51T of the local stations 50-1 to 50-n and outputs a resulting signal (add multiplexing process). Accordingly, the optical demultiplexer 33 and the optical multiplexer 34 described above function as an optical add/drop multiplexing section for performing an optical add/drop multiplexing process for the wavelength division multiplexed optical signal for which the dispersion compensation process has been performed by the first dispersion compensator 32 for the individual wavelength components.

Further, also the second dispersion compensator 35 is formed from a dispersion compensation fiber (DCF) or the like. The second dispersion compensator 35 performs a dispersion compensation process for the wavelength division multiplexed optical signal for which the optical add/drop multiplexing process has been performed and which has been outputted from the optical multiplexer 34 with an over compensation amount DCLb so that the sum of the compensation amount therein and the compensation amount in the first dispersion compensator 32 may exhibit a predetermined proportion to the dispersion appearing in the repeating interval 40-1 to 40-(N−1) on the terminal apparatus 10 side for transmission. The second dispersion compensator 35 thus functions as a second dispersion compensation section.

The amplifier 36 amplifies a wavelength division multiplexed optical signal for which the dispersion compensation process with the over compensation amount has been performed by the second dispersion compensator 35 and transmits a resulting signal to the repeating interval (where the repeating point is the repeating apparatus 30-1, to the repeating interval 40-1) on the terminal apparatus 20 side for reception.

Consequently, for example, in the repeating apparatus 30-1, the first dispersion compensation process by the first dispersion compensator 32, the optical add/drop multiplexing process by the demultiplexer 33 and multiplexer 34 and the second dispersion compensation process by the second dispersion compensator 35 are performed for a wavelength division multiplexed optical signal from the repeating interval 40-1 on the terminal apparatus 10 side for transmission. Then, a resulting signal is signaled to the repeating interval 40-2 in the following stage.

Also in the repeating apparatus 30-2, the first dispersion compensation process, optical add/drop multiplexing process and second dispersion compensation process similar to those in the repeating apparatus 30-1 just described are performed for a wavelength division multiplexed optical signal transmitted from the repeating apparatus 30-1 through the repeating interval 40-2, and then a resulting signal is signaled to the repeating interval 40-3 in the following stage.

Thereafter, also in each of the repeating apparatus 30-3 to 30-(N−1), the processes similar to those in the repeating apparatus 30-1 described above are performed, and a resulting wavelength division multiplexed optical signal is signaled to the repeating interval 40-4 to 40-N in the following stage.

Now, the dispersion compensation amounts DCLa and DCLb used in the first and second dispersion compensators 32 and 35 in each of the repeating apparatus 30-1 to 30-(N−1) are described in detail. It is to be noted that, in the repeating apparatus 30-1 to 30-(N−1), a compensation amount is derived with reference to a dispersion amount in the intermediate wavelength $\lambda_{22}$. Further, in each of the repeating apparatus 30-1 to 30-(N−1), also regarding optical signals having the other wavelength bands $\lambda_1$ to $\lambda_{21}$ and $\lambda_{23}$ to $\lambda_{44}$, the collective dispersion compensation processes are performed with the derived compensation amount as described below while the optical signals are in the state of a wavelength division multiplexed optical signal. Further, a dispersion compensation process with a dispersion slope taken into consideration is performed for each of optical signals having different wavelengths in the terminal apparatus 20 for reception hereinafter described.

First, an optimum dispersion compensation amount DCLa#1 in the first dispersion compensator 32 in the repeating apparatus 30-1 described above can be represented, where the dispersion amount appearing in an optical signal having the intermediate wavelength $\lambda_{22}$ in the repeating interval 40-1 is $D_1$, for example, as an expression [1a] given below. Consequently, in the first dispersion compensator 32 in the repeating apparatus 30-1, the chromatic dispersion appearing in the optical signal having the intermediate wavelength $\lambda_{22}$ in the repeating interval 40-1 can be suppressed to zero (refer to a point $C_1$ of FIG. 3). Here, the compensation amount of dispersion is a dispersion amount for reducing the chromatic dispersion appearing in a wavelength division multiplexed optical signal and has a negative value.

$$DCLa\#1 = -D_1 \quad [1a]$$

Further, as represented by an expression [1b] given below, the over compensation amount DCLb#1 in the second dispersion compensator 35 in the repeating apparatus 30-1 can be set as a value obtained by converting a value calculated by multiplying a dispersion amount $D_1$ appearing in the intermediate wavelength $\lambda_{22}$ in the repeating interval 40-1 described above by a constant proportion β into a negative value (refer to FIG. 3).

$$DCLb\#1 = -(\beta \times D_1) = -\beta D_1 \quad [1b]$$

Further, an optimum dispersion compensation amount DCLa#2 in the first dispersion compensator 32 in the repeating apparatus 30-2 described above can be represented, where it is assumed that the dispersion amount $D_2$ appearing in an optical signal having the intermediate wavelength $\lambda_{22}$ originates from the repeating interval 40-2, for example, as an expression [2a] given below.

In particular, the dispersion amount of the optical signal having the intermediate wavelength $\lambda_{22}$ at the point of time wherein this optical signal is signaled from the repeating apparatus 30-1 to the repeating interval 40-2 is equal to a value indicated by the expression [1b]. Therefore, the value just described to which a dispersion amount $D_2$ is added is a dispersion amount which is to be compensated for in the first dispersion compensator 32 in the repeating apparatus 30-2 (refer to FIG. 3). It is to be noted that an actual compensation amount is obtained by converting the value of the dispersion amount into a negative value.

$$DCLa\#2 = -(-\beta D_1 + D_2) = \beta D_1 - D_2 \quad [2a]$$

Further, as represented by an expression [2b] given below, an over compensation amount DCLb#2 in the second dispersion compensator 35 in the repeating apparatus 30-2 can be set as a value obtained by converting a value calculated by multiplying the sum total $D_1 + D_2$ of the dispersion amount appearing in the two repeating intervals 40-1 and 40-2 described above by the constant proportion $\beta$ into a negative value (refer to FIG. 3).

$$DCLb\#2 = -\{\beta \times (D_1 + D_2)\} = -(D_1 + D_2) \quad [2b]$$

Also a dispersion compensation amount and an over compensation amount in each of the first and second dispersion compensators 32 and 35 in the repeating apparatus 30-3 to 30-(N−1) can be calculated similarly to those in the repeating apparatus 30-1 and 30-2 described above.

An expression [3a] represents an optimum dispersion compensation amount DCLa#i to be used for the compensation in the first dispersion compensator 32 in the repeating apparatus 30-i [i; 2 to (N−1)]. In the first dispersion compensator 32 in the repeating apparatus 30-2 to 30-(N−1), the chromatic dispersion appearing in the optical signal having the intermediate wavelength $\lambda_{22}$ in the repeating apparatus 40-2 to 40-(N−1) in the preceding stage can be suppressed to zero (refer to points $C_2$ to $C_{n-1}$ of FIG. 3).

Figure 3:
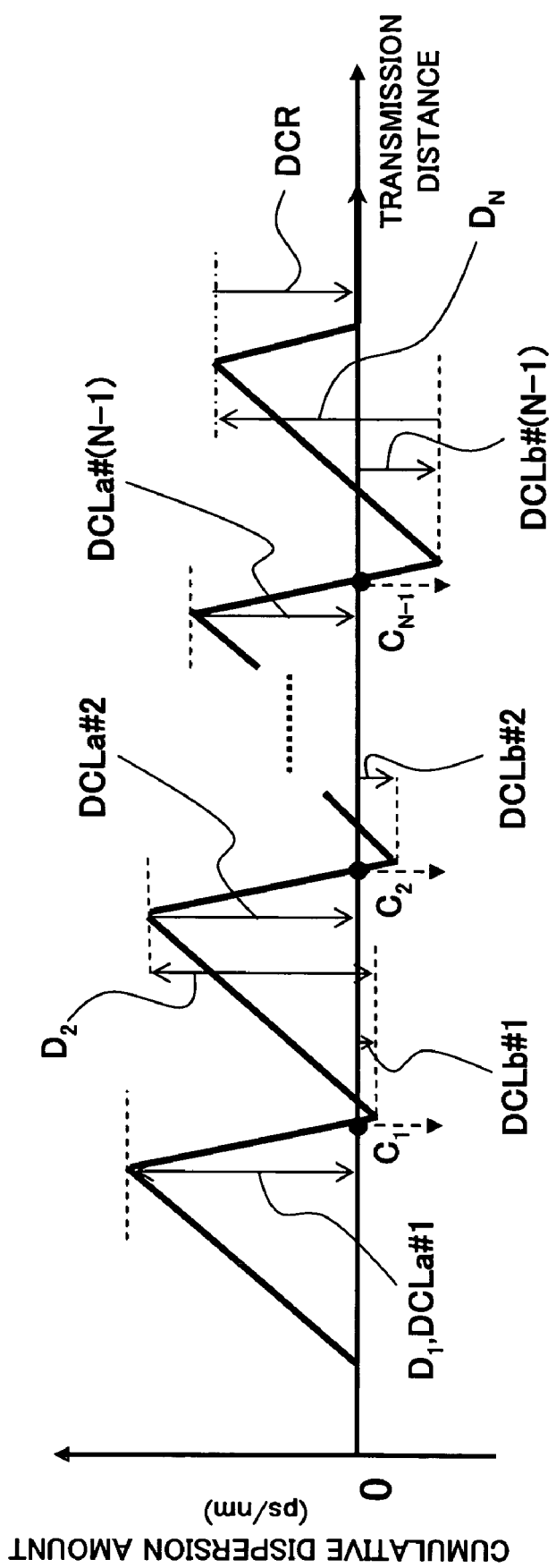
FIG. 3 is a diagrammatic view illustrating a mode of dispersion compensation of the wavelength division multiplexing optical repeating transmission system according to the first embodiment of the present invention.

Further, an expression [3b] represents an over compensation amount DCLb#i to be used for the compensation in the second dispersion compensator 35 in the repeating apparatus 30-i [i; 2 to (N−1)] (refer to FIG. 3). In particular, the over compensation amount DCLb#i can be set as a value obtained by converting a value calculated by multiplying the sum total of the dispersion amounts appearing in the repeating intervals 40-1 to 40-(i−1) by the constant proportion $\beta$ into a negative value (refer to FIG. 3).

$$DCLa\#i = \beta \sum_{j=1}^{i-1} D_j - D_i \quad [3a]$$

$$DCLb\#i = -\beta \sum_{j=1}^{i} D_j \quad [3b]$$

In particular, by using the dispersion $D_i$ appearing in the intermediate wavelength $\lambda_{22}$ of the wavelength division multiplexed optical signal propagated through the repeating interval 40-(i−1) and a cumulative value of the compensation amounts in the repeating intervals 40-1 to 40-(i−1), the optimum dispersion compensation amount DCLa#i in the first dispersion compensator 32 can be derived. Further, as given by the expression [3b] above, the over compensation amount increases (the absolute value in the expression [3b] increases) as the transmission distance from the terminal apparatus 10 for transmission increases.

Further, the ratio $R_1$ of the dispersion compensation amount in the second dispersion compensator 35 to the sum of the dispersion compensation amounts in the first and second dispersion compensators 32 and 35 in the repeating apparatus 30-1 described above is calculated as given by an expression [4-1] below. Further, the ratio $R_i$ of the dispersion compensation amount in the second dispersion compensator 35 to the sum of the dispersion compensation amounts in the first and second dispersion compensators 32 and 35 in the repeating apparatus 30-i is calculated, using results of the expressions [3a] and [3b], as given by an expression [4-i] below. It is to be noted that also this expression [4-i] is applicable where i=1 (that is, $R_1$).

$$R_1 = \frac{-\beta D_1}{-\beta D_1 - D_1} = \frac{\beta}{\beta + 1} \quad [4-1]$$

$$R_i = \frac{-\beta \sum_{j=1}^{i} D_j}{\beta \sum_{j=1}^{i-1} D_j - D_i - \beta \sum_{j=i}^{i} D_i} = \frac{\beta}{1+\beta} \sum_{j=1}^{i} \frac{D_j}{D_i} \quad [4-i]$$

Here, the preceding term which does not include the sigma term of the expression obtained in the expression [4-i] has a constant value while the succeeding term has a value which gradually increases together with the transmission distance (as the value of i increases) (Di>0). In particular, the ratio $R_i$ of the over compensation amount in the second dispersion section 35 to the sum of the dispersion compensation amounts in the first and second dispersion compensators 32 and 35 is set so as to gradually vary (gradually increase) together with the transmission distance from the terminal apparatus 10 for transmission in which the repeating apparatus 30-i is arranged.

It is to be noted that to gradually increase signifies a phenomenon that the ratio $R_i$ of the over compensation amount gradually increases together with the transmission distance from the terminal apparatus 10 for transmission without decreasing intermediately. Further, as hereinafter described, since the ratio of the over compensation amount in the second dispersion compensator 35 to the sum of the dispersion compensation amounts of the first and second dispersion compensators 32 and 35 is set as the gradually increasing proportion $R_i$, the waveform degradation in the terminal apparatus 20 for reception can be suppressed more than that in an alternative case wherein the ratio is constant.

Incidentally, a configuration of the terminal apparatus 20 for reception is described just below. The terminal apparatus 20 for reception includes a dispersion compensator/amplifier 21, a demultiplexer 22, forty-four variable dispersion compensators (VDC) 23-1 to 23-44 and forty-four optical reception sections 24-1 to 24-44.

The dispersion compensator/amplifier 21 amplifies a wavelength division multiplexed optical signal inputted through the repeating interval 40-N and compensates for the dispersion $D_N$ appearing in the wavelength division multiplexed optical signal propagated through the repeating interval 40-N with the compensation amount DCR cooperating with a cumulative value of the over compensation amount in the repeating intervals 40-1 to 40-N. It is to be noted that also the value of the dispersion $D_N$ just mentioned is a dispersion value appearing in the intermediate wavelength band $\lambda_{22}$.

In particular, the dispersion amount of the intermediate wavelength band $\lambda_{22}$ at the time point at which the wavelength division multiplexed optical signal is signaled from the repeating apparatus 30-(N−1) to the repeating interval 40-N is DCLb#(N−1) (refer to the expression [3b]). Accordingly, the compensation amount DCR for the chromatic dispersion of the optical signal of the intermediate wavelength $\lambda_{22}$ to be reduced to zero by the dispersion compensator/amplifier 21 can be given as an expression [5] using the dispersion value $D_N$ described above (refer to FIG. 3).

$$DCR = -\left(-\beta \sum_{j=1}^{n-1} D_j + D_N\right) = -D_N + \beta \sum_{j=1}^{n-1} D_j \quad [5]$$

The demultiplexer 22 wavelength demultiplexes a wavelength division multiplexed optical signal from the dispersion compensator/amplifier 21 into forty-four different wavelength components. The variable dispersion compensators 23-1 to 23-44 individually compensate for residual dispersions appearing in the optical signals wavelength demultiplexed by the demultiplexer 22. Consequently, an influence of dispersion slopes having dispersion amounts different among different wavelengths can be eliminated and dispersion values of the optical signals of the wavelengths can be reduced to zero which is an optimum value.

The optical reception sections 24-1 to 24-44 perform a reception process for the optical signals whose dispersion values of the wavelengths have been optimally compensated for by the variable dispersion compensators 23-1 to 23-44, respectively.

Since the wavelength division multiplexing optical repeating transmission system 1A in the first embodiment of the present invention has the configuration described above, it compensates for dispersion of a wavelength division multiplexed optical signal and compensates, regarding optical signals dropped by the repeating apparatus 30-1 to 30-(N−1), for dispersion of them with optimum compensation amounts as hereinafter described.

First, while the terminal apparatus 10 for transmission signals a wavelength division multiplexed optical signal wherein the forty-four different wavelengths $\lambda_1$ to $\lambda_{44}$ are wavelength division multiplexed, chromatic dispersion arising from propagation of the optical signal in an optical fiber does not appear at this point of time.

Figure 4:
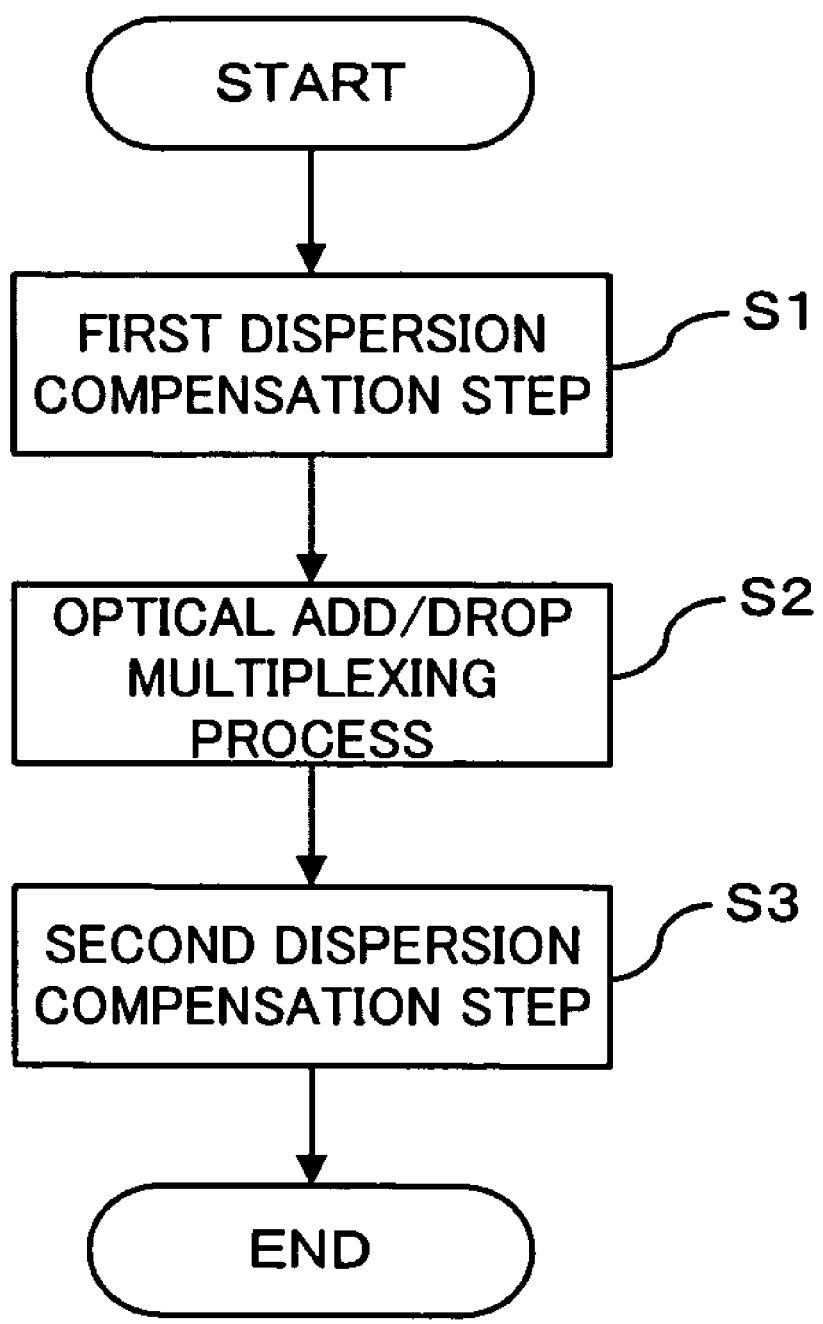
FIG. 4 is a flow chart illustrating operation of the repeating apparatus according to the first embodiment of the present invention.

Further, in each of the repeating apparatus 30-1 to 30-(N−1) positioned at end points of individual repeating intervals, as shown in a flow chart of FIG. 4, the dispersion included in the wavelength division multiplexed optical signal propagated in the repeating interval 40-1 to 40-(N−1) on the terminal apparatus 10 side for transmission is compensated for so as to be included within a tolerance set in advance by the first dispersion compensator 32 (first dispersion compensation step, step S1). In particular, the dispersion of the wavelength division multiplexed optical signal is compensated for (with the compensation amount DCLa) so that the dispersion of the intermediate wavelength $\lambda_{22}$ may be reduced to zero as described hereinabove.

Then, the optical add/drop multiplexing process is performed for the wavelength division multiplexed optical signal whose dispersion has been compensated for at the first dispersion compensation step by the demultiplexer 33 and multiplexer 34 (optical add/drop multiplexing step, step S2). In particular, the optical signal for which the optical add/drop multiplexing process has been performed is in a state where the dispersion thereof is optimally compensated for. Therefore, an optical signal whose waveform degradation is optimally compensated for can be received by the local stations 50-1 to 50-n.

Further, the second dispersion compensator 35 performs the dispersion compensation process with the over compensation amount DLCb for the wavelength division multiplexed optical signal for which the optical add/drop multiplexing process has been performed at the optical add/drop multiplexing step and whose dispersion has been compensated for so as to be included within the tolerance described above so that the sum of the compensation amount in the first dispersion compensator 32 and the compensation amount in the second dispersion compensator 35 exhibits a predetermined proportion to the sum total of the dispersion appearing in the repeating intervals, and transmits a resulting signal to the repeating interval on the reception terminal apparatus side (second dispersion compensation step, step S3).

At this time, the preceding repeating apparatus (30-1) in two repeating apparatus (for example, the repeating apparatus 30-1 and 30-2) adjacent each other on the transmission line 40 signals the first wavelength division multiplexed optical signal for which the dispersion compensation process has been performed with the over compensation amount described above by the second dispersion compensator 35 to the repeating interval 30-2 on the terminal apparatus 20 side for reception (second dispersion compensation step). The succeeding repeating apparatus 30-2 compensates for the dispersion included in the first wavelength division multiplexed optical signal so as to be included within a tolerance set in advance (first dispersion compensation step).

Further, in the repeating apparatus 30-i [i; 1 to (N−1)], the ratio $R_i$ of the over compensation amount in the first dispersion compensator 32 to the compensation amount in the second dispersion compensator 35 when the dispersion compensation process is performed is set so as to gradually increase together with the transmission distance from the terminal apparatus 10 for transmission on the optical transmission line 40 to the repeating apparatus 30-i. Therefore, the waveform degradation of the optical signals of the wavelengths to be received by the terminal apparatus 20 for reception can be optimally compensated for.

Further, where residual dispersion appears in the wavelength division multiplexed optical signal received by the terminal apparatus 20 for reception, the variable dispersion compensators 23-1 to 23-44 compensate for the residual dispersion for the individual optical signals of the wavelengths.

FIGS. 5 to 7, 8(a) to 8(c) and 9 are views illustrating that, in the wavelength division multiplexing optical repeating transmission system 1A described above with reference to FIG. 1, the waveform degradation of the wavelength division multiplexed optical signal to be received by the terminal apparatus 20 for reception can be optimally compensated for by the process with the over compensation amount in the repeating apparatus 30-1 to 30-(N−1).

Figure 5:
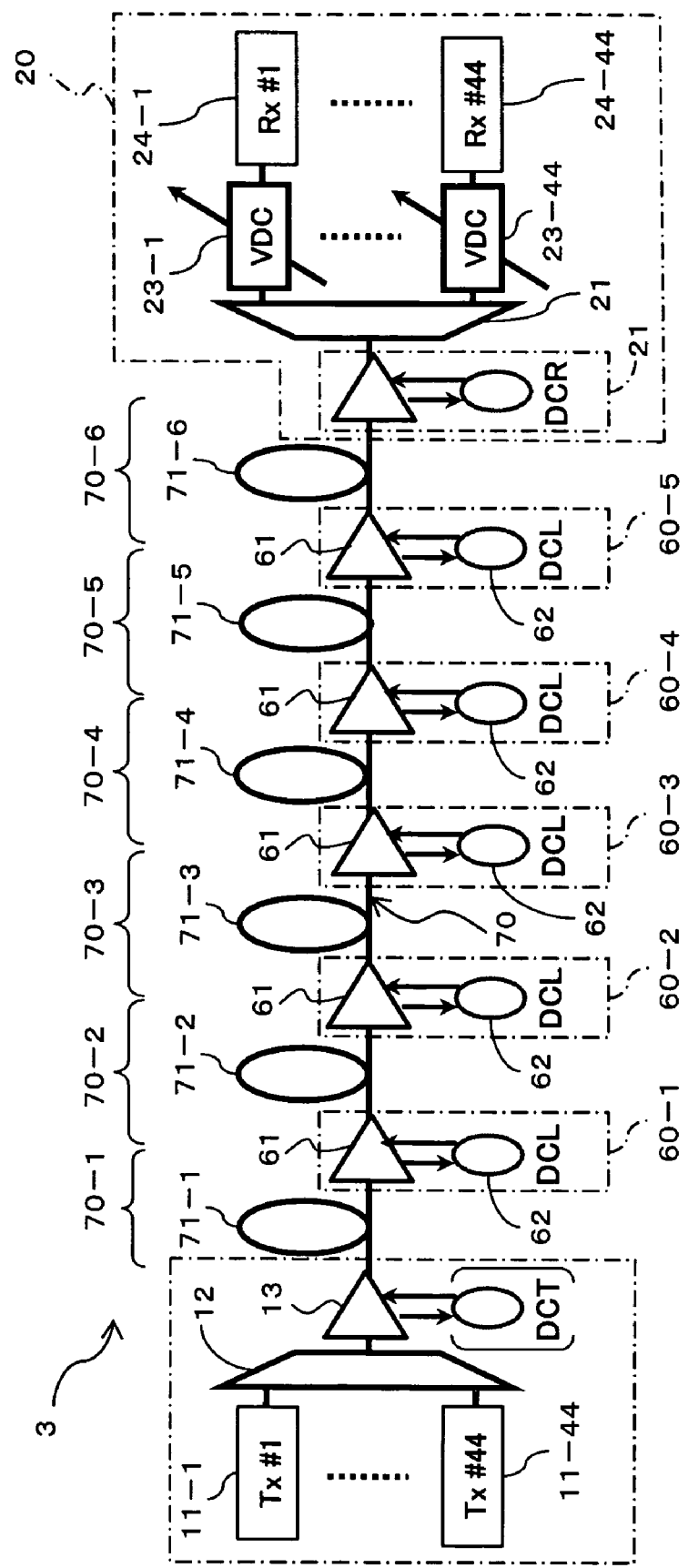
FIG. 5 is a block diagram showing a wavelength division multiplexing optical repeating transmission system and illustrating operation and an effect of the first embodiment of the present invention.

Here, in a wavelength division multiplexing optical repeating transmission system 3 shown in FIG. 5, the terminal apparatus 10 for transmission and the terminal apparatus 20 for reception are connected to each other by an optical transmission line 70 to perform linear repeating transmission of a wavelength division multiplexed optical signal. In the optical transmission line 70, repeating intervals (spans) 70-1 to 70-6 thereof are individually delimited by five linear repeating sections 60-1 to 60-5. Further, the repeating intervals 70-1 to 70-6 are formed from optical fibers 71-1 to 71-6 having a length of approximate 100 km, respectively.

In particular, different from the wavelength division multiplexing optical repeating transmission system 1A in the first embodiment shown in FIG. 1, the wavelength division multiplexing optical repeating transmission system 3 includes not the repeating apparatus 30-1 to 30-(N−1) but the linear repeating sections 60-1 to 60-5 which do not have an optical add/drop multiplexing function. It is to be noted that, in FIG. 5, substantially like elements to those in FIG. 1 are denoted by like reference characters.

Further, the linear repeating sections 60-1 to 60-5 individually include an amplifier 61 and a dispersion compensator 62. Similarly as in the repeating apparatus 30-1 to 30-(N−1), the dispersion compensator 62 compensates for a dispersion amount on a transmission line in the corresponding repeating interval with an over compensation amount and transmits a resulting signal to a succeeding one of the repeating intervals 70-2 to 70-6.

Figure 6:
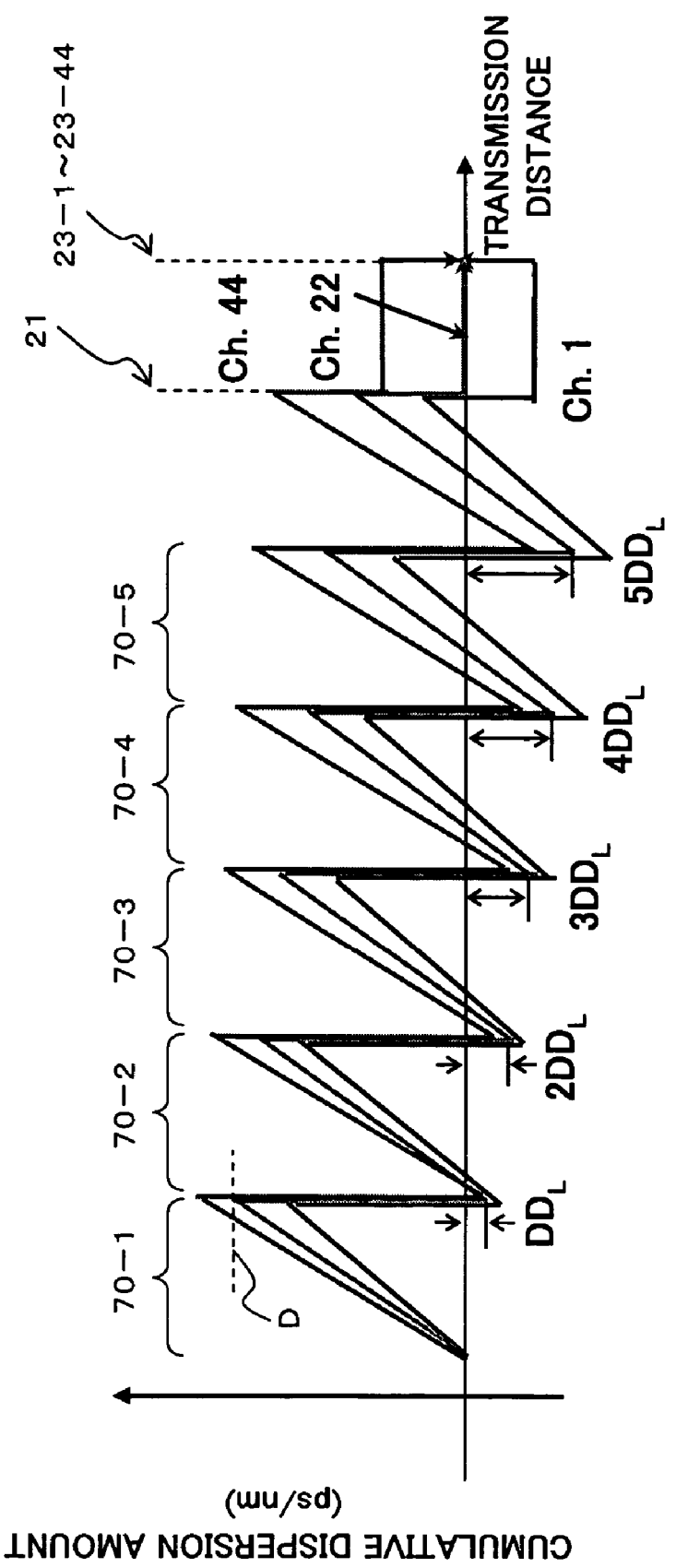
FIG. 6 is a diagrammatic view illustrating a mode of dispersion compensation of the wavelength division multiplexing optical repeating transmission system shown in FIG. 5.

In this instance, where, in the linear repeating sections 60-1 to 60-5, a compensation process with 114% is cumulatively performed for the transmission line dispersion amount D of the intermediate wavelength band $\lambda_{22}$ in the preceding repeating intervals 70-1 to 70-5 (where 14% of the dispersion amount D is used as an over compensation amount [dispersion shear amount] $\Delta D_L$ in the compensation, refer to FIG. 6), over compensation amounts cumulated in the linear repeating sections 60-1 to 60-5 are $\Delta D_L$, $2\Delta D_L$, $3\Delta D_L$, $4\Delta D_L$, and $5\Delta D_L$, respectively. In particular, similarly as in the first embodiment described above, the over compensation amounts cumulated in the repeating sections 60-1 to 60-5 are set so as to gradually increase together with the transmission distance from the terminal apparatus 10 for transmission.

As described above, the repeating intervals 70-1 to 70-5 are formed from a single mode fiber (SMF) having a length of approximately 100 km, and therefore, the transmission line dispersion amounts in the repeating intervals 70-1 to 70-5 can be controlled to the dispersion amounts D substantially equal to each other. In this instance, the expression [4-i] given hereinabove can be represented as an expression [4'] as given below. It is to be noted that, where the over compensation process is performed by the second dispersion compensator 35 ($\beta>0$), this value can be considered to gradually increase together with the transmission distance from the terminal apparatus 10 for transmission.

$$R_i = \frac{\beta}{D_i(1+\beta)} \sum_{j=1}^{i} D_j = \frac{\beta}{(1+\beta)} \times i \quad [4']$$

Figure 7:
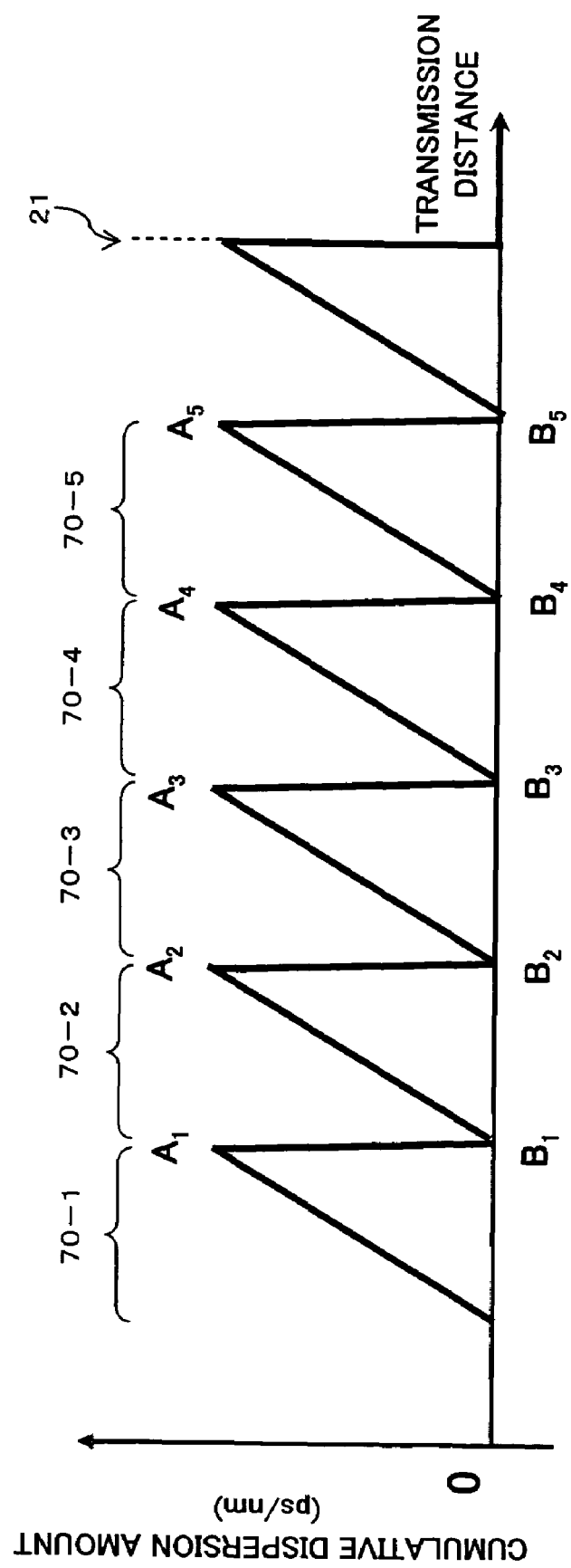
FIG. 7 is a diagrammatic view illustrating an effect of the dispersion compensation by the mode illustrated in FIG. 6.
Figure 8A:
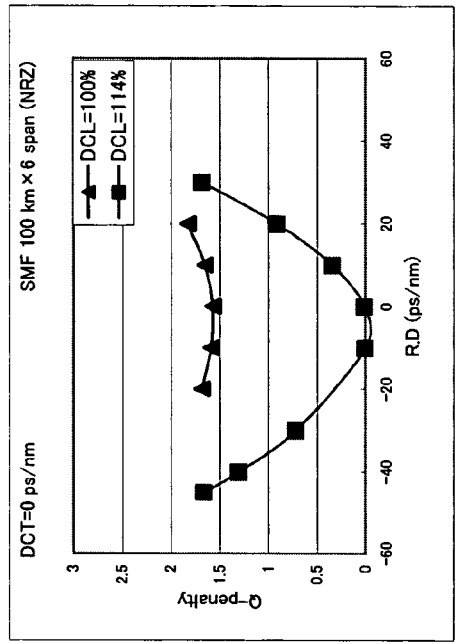
FIGS. 8(a) to 8(c) are diagrams illustrating an effect of the dispersion compensation by the mode shown in FIG. 6.
Figure 8B:
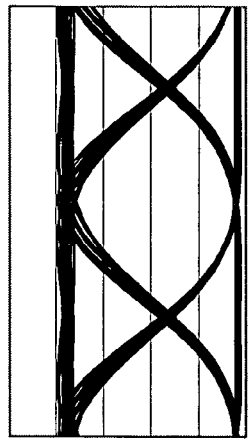
Figure 8C:
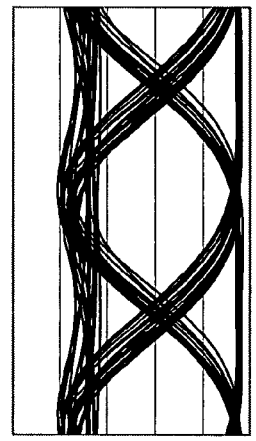

In the wavelength division multiplexing optical repeating transmission system 3 having such a configuration as described above, where the wavelength degradation of the wavelength division multiplexed optical signal to be received by the terminal apparatus 20 for reception is compared between the case wherein, in the linear repeating sections 60-1 to 60-5, the compensation process is performed for the transmission line dispersion amount D in the intermediate wavelength band $\lambda_{22}$ described above for each 1 span with, for example, a dispersion compensation coefficient of 114% (where 14% of the dispersion amount D is used as the over compensation amount [dispersion shear amount] $\Delta D_L$ in the compensation, refer to FIG. 6) and an alternative case wherein such a dispersion compensation process as seen in FIG. 7 is performed, such a result as described below is obtained.

Here, in FIG. 7, the linear repeating sections 60-1 to 60-5 in a wavelength division multiplexing optical repeating transmission system 1A' having a configuration similar to that shown in FIG. 5 perform a dispersion compensation process with a dispersion compensation coefficient of 100% for transmission line dispersion amounts $A_1$ to $A_5$ appearing in the intermediate wavelength band $\lambda_{22}$ in the repeating intervals 70-1 to 70-5 without performing the over compensation process, and transmit a wavelength division multiplexed optical signal having dispersion amounts optimally compensated for as indicated by reference characters B1 to B5 to the terminal apparatus 20 for reception.

At this time, where the waveform degradations of the wavelength division multiplexed optical signal to be received by the terminal apparatus 20 for reception are compared with each other in a case wherein the settings for the dispersion compensation process in the linear repeating sections 60-1 to 60-5 are determined as shown in FIG. 6 or 7, such results of the comparison as seen in FIGS. 8($a$) to 8($c$) are obtained.

FIGS. 8($a$) to 8($c$) are views illustrating results of comparison of the Q penalty (degradation amount of a Q value which represents a waveform characteristic) with respect to the residual dispersion (total dispersion amount of the transmission line and the dispersion compensators) regarding the cases wherein the dispersion compensation processes illustrated in FIGS. 6 and 7 are performed.

Here, the Q penalty is a difference between the back-to-back value of the Q value and the value of the Q value after transmission through the transmission line. The Q value is a value obtained by dividing, where an optical signal waveform is converted into an electric signal to obtain an eye pattern and a cross section of the eye is taken in a longitudinal direction at the center of the eye, the sum of a standard deviation of a sample distribution on the "1" side and a standard deviation of a sample distribution on the "0" side by the distance between the center of the "1" side sample distribution and the center of the "0" side sample distribution.

Here, FIG. 8($a$) shows an example where the Q penalty is plotted for all of the residual dispersion values. Further, points indicated by black triangles indicate a distribution of the residual dispersion value when the 114% dispersion compensation process illustrated in FIG. 6 is performed while points indicated by black squares indicate a distribution of the residual dispersion value when the 100% dispersion compensation process illustrated in FIG. 7 is performed. Further, FIG. 8($b$) shows an eye pattern where the 114% dispersion compensation process illustrated in FIG. 6 is performed, and FIG. 8($c$) shows an eye pattern where the 100% dispersion compensation process illustrated in FIG. 7 is performed.

As seen in FIG. 8($a$), where the 114% overcompensation process illustrated in FIG. 6 is performed, the value of the Q penalty can reduced and waveform degradation can be suppressed more than that in the alternative case wherein the 100% dispersion compensation process illustrated in FIG. 7 is performed.

It is to be noted that, when the waveform degradation just described is evaluated, the sum (DCR+VDC) of the dispersion compensation amounts in the dispersion compensator/amplifier 21 and the variable dispersion compensators 23-1 to 23-44 in the terminal apparatus 20 for reception described above must be adjusted to set the residual dispersion strictly to zero.

Figure 9:
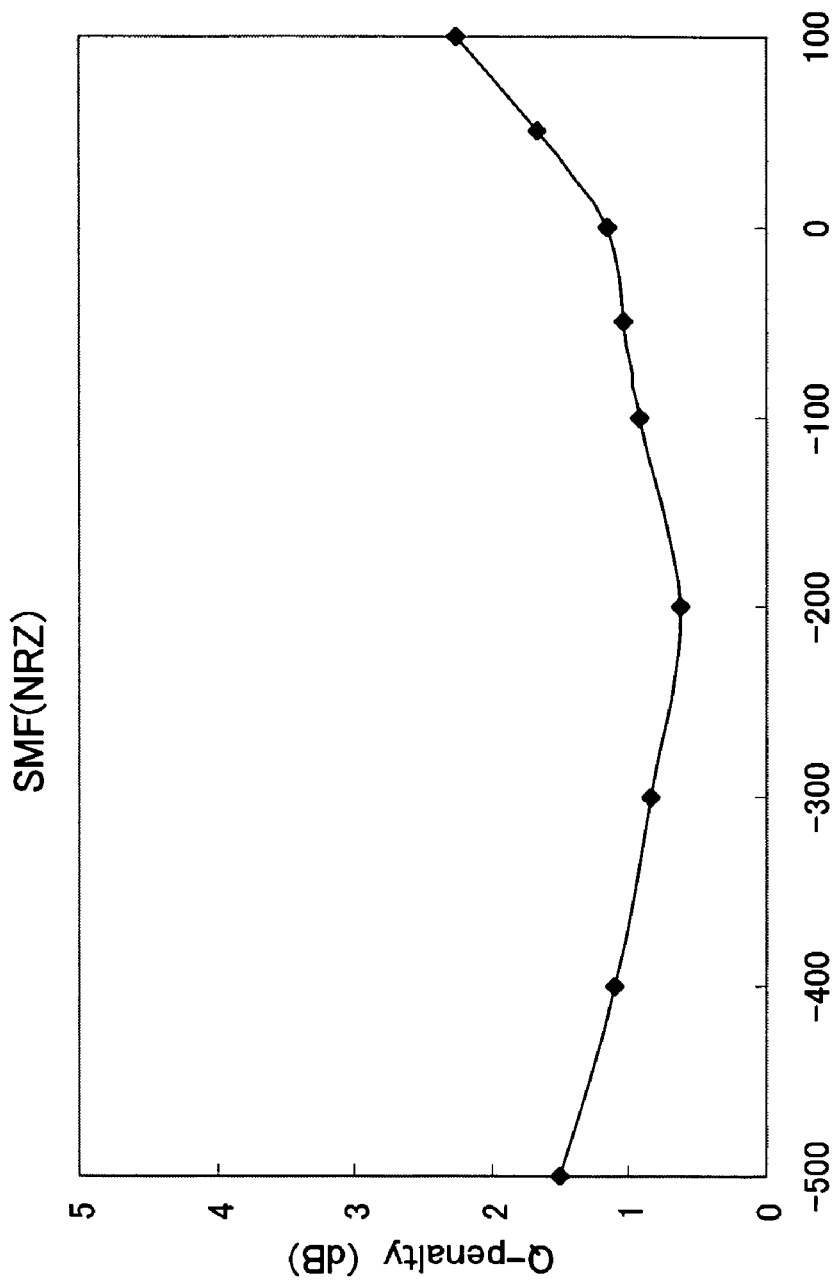
FIG. 9 is a graph illustrating an effect of the dispersion compensation by the mode illustrated in FIG. 6.

FIG. 9 is a view illustrating a characteristic of the Q penalty with respect to the dispersion displacement amount $\Delta D$ [dispersion amount appearing per 1 span×(1−dispersion compensation coefficient)] in the linear repeating sections 60-1 to 60-5 where, in the wavelength division multiplexing optical repeating transmission system 3 shown in FIG. 5, the dispersion compensation amount DCR in the dispersion compensator/amplifier 21 in the terminal apparatus 20 for reception is adjusted to reduce the residual dispersion to zero.

As seen in FIG. 9, where the 114% over compensation process is performed by the dispersion compensator 62 in the linear repeating sections 60-1 to 60-5, the value of the Q penalty is lower than that in the alternative case wherein the 100% compensation process is performed. In particular, the value of the Q penalty is favorable where the dispersion displacement amount ΔD corresponds to the dispersion compensation coefficient of approximately 105% to 120%, and particularly, the characteristic of the Q penalty is most favorable at or around the value of the displacement amount ΔD=− 200 ps/nm which corresponds to the dispersion compensation coefficient of approximately 114%.

Figure 10:
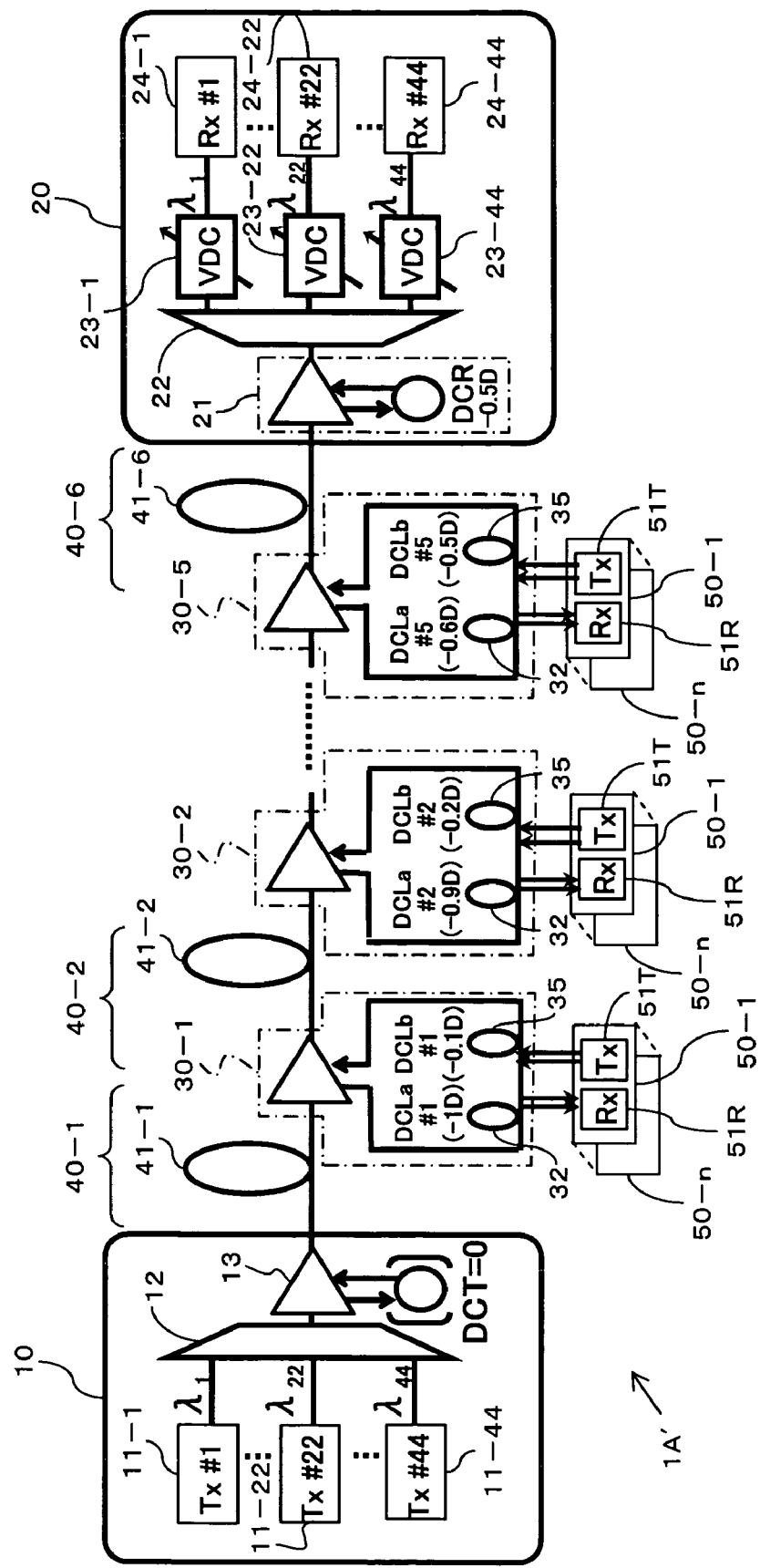
FIG. 10 is a block diagram showing a wavelength division multiplexing optical repeating transmission system where the number of repeating apparatus is 5 in the first embodiment of the present invention.

In a wavelength division multiplexing optical repeating transmission system 1A' shown in FIG. 10, the transmission line 40 is divided into six repeating intervals 40-1 to 40-6 by five repeating apparatus 30-1 to 30-5 in the wavelength division multiplexing optical repeating transmission system 1A described hereinabove with reference to FIG. 1. Further, the repeating intervals 40-1 to 40-6 are formed from a single mode fiber having a length of approximately 100 km, and the dispersion amount appearing in the intermediate wavelength band $\lambda_{22}$ in them can be suppressed substantially equal to the dispersion amount D.

Further, the first dispersion compensators 32 of the repeating apparatus 30-1 to 30-5 perform the compensation process with the 100% dispersion compensation coefficient, and the second dispersion compensators 35 perform the over compensation process with the over compensation coefficient of β=10%. In other words, by cooperation of the first dispersion compensator 32 and the second dispersion compensator 35, the dispersion compensation process can be performed with the 110% dispersion compensation coefficient wherein the most favorable Q penalty can be obtained.

In this instance, the first dispersion compensator 32 of the repeating apparatus 30-1 performs the dispersion compensation process with a compensation amount −D, and the second dispersion compensator 35 of the repeating apparatus 30-1 performs the over compensation process with an over compensation amount −0.1D. Similarly, the first dispersion compensator 32 of the repeating apparatus 30-2 performs the dispersion compensation process with the compensation amount −D, and the second dispersion compensator 35 of the repeating apparatus 30-2 performs the over compensation process with the over compensation amount −0.1D.

Similarly, also the compensation amounts and the over compensation amounts of the first and second dispersion compensators 32 and 35 in the repeating apparatus 30-2 to 30-5 can be calculated using the expressions [3a] and [3b] given hereinabove.

Figure 11:
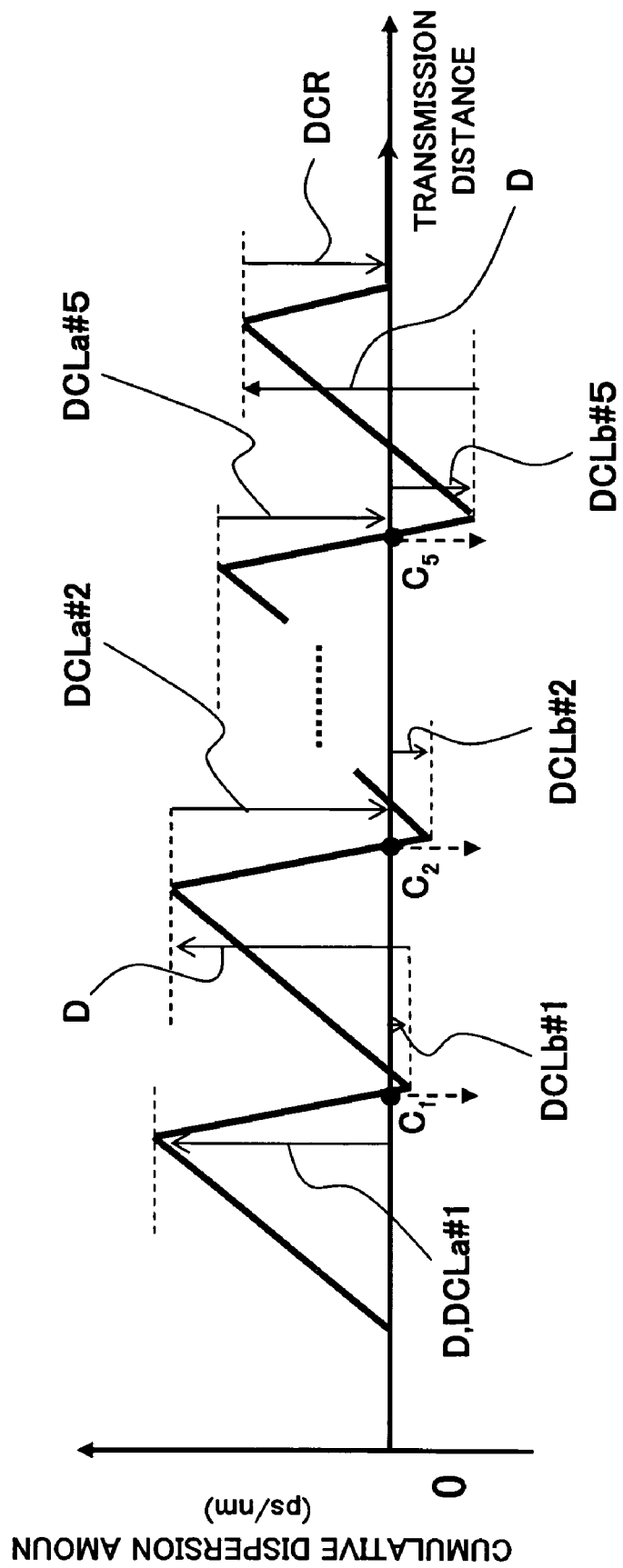
FIG. 11 is a diagrammatic view illustrating a mode of dispersion compensation of the wavelength division multiplexing optical repeating transmission system shown in FIG. 10.

In particular, the compensation amounts DCLa#1 to DCLa#5 in the first dispersion compensators 32 in the repeating apparatus 30-2 to 30-5 indicate −0.9D, −0.8D, −0.7D, −0.7D, and −0.6D, respectively, and the compensation amounts DCLb#1 to DCLb#5 in the second dispersion compensators 35 in the repeating apparatus 30-2 to 30-5 indicate −0.1D, −0.2D, −0.3D, −0.4D, and −0.5D, respectively (refer to FIG. 11).

In this manner, according to the first embodiment of the present invention, after the first dispersion compensator 32 optimally compensates for the dispersion included in a wavelength division multiplexed optical signal propagated through the repeating interval 30-1 to 30-(N−1) on the terminal apparatus 10 for transmission side so as to be included within the tolerance set in advance (first dispersion compensation step), an optical add/drop multiplexing process can be performed by the optical demultiplexer 33 and the optical multiplexer 34 (refer to FIG. 2) (optical add/drop multiplexing step). Therefore, the chromatic dispersion of optical signals to be received by the local stations 50-1 to 50-n can be optimally compensated for to improve the characteristic of the reception optical signals. Further, the predetermined proportion R for performing the dispersion compensation process with the over compensation amount at the second dispersion compensation step can be set so as to gradually increase together with the transmission distance from the terminal apparatus 10 for transmission on the optical transmission line 40 to the repeating apparatus 30-1 to 30-(N−1). Consequently, the waveform degradation of the optical signals of the wavelengths to be received by the terminal apparatus 20 for reception can be optimally compensated for.

[B] First Modification to the First Embodiment

Figure 12:
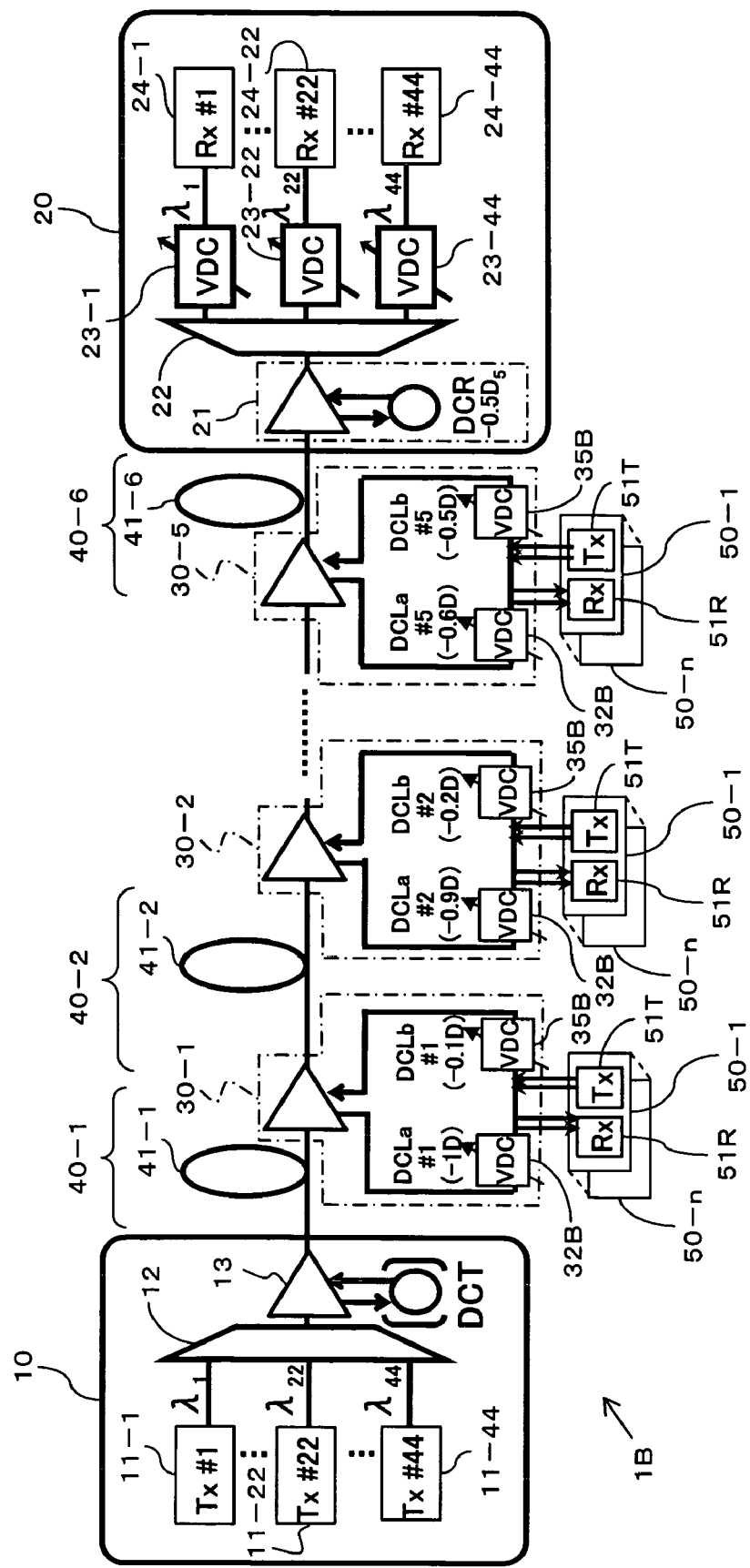
FIG. 12 is a block diagram showing a wavelength division multiplexing optical repeating transmission system according to a first modification to the first embodiment of the present invention.

FIG. 12 is a block diagram showing a wavelength division multiplexing optical repeating transmission system 1B according to a first modification to the first embodiment of the present invention. Referring to FIG. 12, The wavelength division multiplexing optical repeating transmission system 1B shown is different from the wavelength division multiplexing optical repeating transmission system 1A described hereinabove with reference to FIG. 1 in that the first and second dispersion compensators 32B and 35B of the repeating apparatus 30-1 to 30-5 are formed from a variable dispersion compensator (VDC) which can vary a setting of a dispersion amount therein. The configuration of the wavelength division multiplexing optical repeating transmission system 1B except the difference just described is basically similar to that of the wavelength division multiplexing optical repeating transmission system 1A.

Also in the repeating apparatus 30-1 to 30-5 formed as just described, similarly as in those in the first embodiment, after the first dispersion compensator 32B compensates for the dispersion included in a wavelength division multiplexed optical signal propagated through the repeating intervals 30-1 to 30-(N−1) on the terminal apparatus 10 for transmission side can be optimally compensated for so as to be included within a tolerance set in advance (first dispersion compensation step), the predetermined proportion R for performing the dispersion compensation process with the over compensation amount (in the second dispersion compensation step) in the dispersion compensator 35B can be set so as to gradually increase together with the transmission distance from the terminal apparatus 10 for transmission on the optical transmission line 40 to the repeating apparatus 30-1 to 30-(N−1). Therefore, advantages similar to those of the first embodiment described hereinabove can be achieved by the wavelength division multiplexing optical repeating transmission system 1B.

Further, in the configuration of the repeating apparatus 30-1 to 30-5 shown in FIG. 1 (or FIG. 5) in the first embodiment described hereinabove, a large number of different fixed dispersion compensators corresponding to the first and second dispersion compensators 32 and 35 in the repeating apparatus 30-1 to 30-(N−1) must be prepared. However, according to the configuration of the present modification, only it is necessary to prepare one kind of a variable dispersion compensator and change the setting value therein. Therefore, a network for compensating for dispersion can be constructed readily. Further, there is an advantage also in that, even if transmission parameters such as the bit rate and the length of a transmission line vary to vary the optimum value of the proportion or the total amount of the dispersion compensation amounts in the preceding and succeeding stages, if the setting of the compensation amount of the variable dispersion compensator is changed, then the problem of the variation just described can be coped with readily.

[C] Second Modification to the First Embodiment

Figure 13:
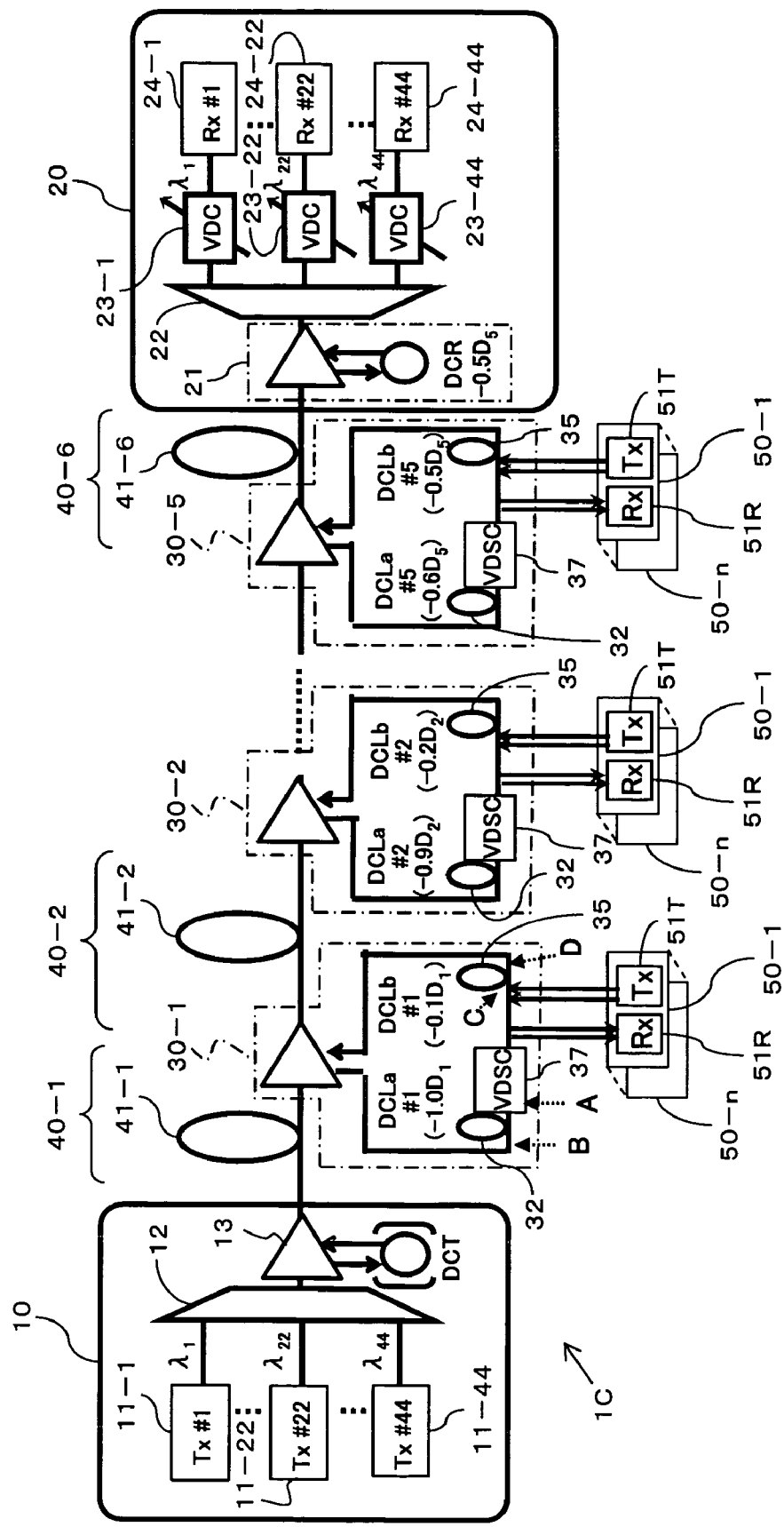
FIG. 13 is a block diagram showing a wavelength division multiplexing optical repeating transmission system according to a second modification to the first embodiment of the present invention.

FIG. 13 is a block diagram showing a wavelength division multiplexing optical repeating transmission system 1C according to a second modification to the first embodiment of the present invention. Referring to FIG. 13, the wavelength division multiplexing optical repeating transmission system 1C shown is different from the wavelength division multiplexing optical repeating transmission system 1A described hereinabove with reference to FIG. 1 in that the repeating apparatus 30-1 to 30-5 include a variable dispersion slope compensator 37 for compensating for a variable dispersion slope in the preceding stage to the add/drop multiplexing process in the optical multiplexer 33 in addition to the components shown in FIG. 2.

In the configuration shown in FIG. 5, the proportion of the dispersion compensation amounts in the first and second dispersion compensators 32 and 35 is adjusted so that the residual dispersion in the repeating apparatus 30-1 to 30-5 is reduced to zero in the central wavelength (for example, $\lambda_{22}$). Actually, however, there is the possibility that a dispersion amount at a position (refer to points $C_1$ to $C_5$ of FIG. 14) at which the optical add/drop multiplexing process is performed for another channel may remain to such a degree that it has an influence on the dispersion tolerance due to the residual dispersion slope in the transmission line fiber and dispersion compensators.

Figure 14:
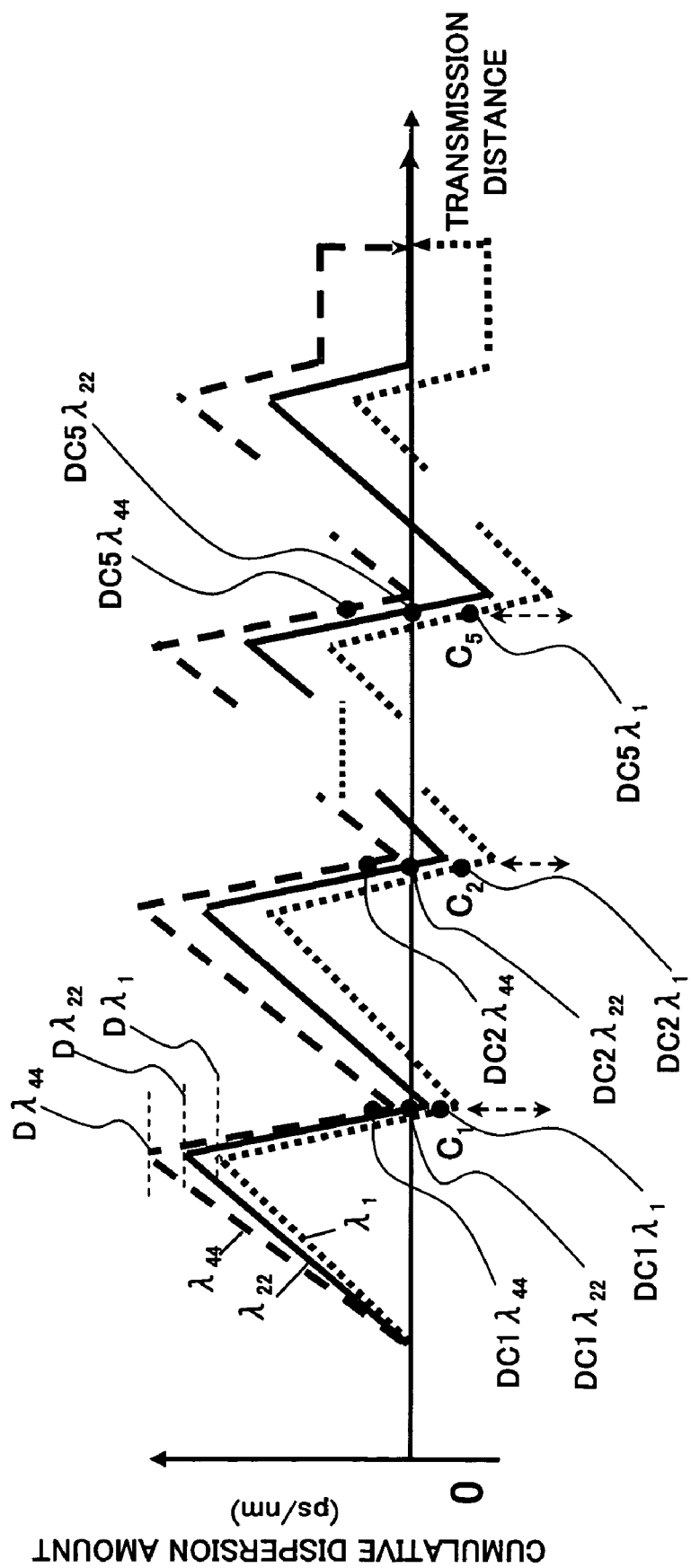
FIG. 14 is a diagrammatic view illustrating a mode of dispersion compensation of the wavelength division multiplexing optical repeating transmission system shown in FIG. 13.

For example, where the dispersion amount appearing in a wavelength division multiplexing optical signal propagated through the optical fiber 41-1 includes a dispersion amount $D\lambda_1$ in a component of the wavelength $\lambda_1$, another dispersion amount $D\lambda_{22}$ in a component of the wavelength $\lambda_{22}$ and a further dispersion amount $D\lambda_{44}$ in a component of the wavelength $\lambda_{44}$ as seen in FIG. 14, if only the dispersion compensation process with reference to the central wavelength $\lambda_{22}$ by the first and second dispersion compensators 32 and 35 is performed, then the residual dispersion cumulatively increases as the transmission distance, that is, the number of repeating stages, increases.

For example, the dispersion of the residual dispersion amounts $DC5\lambda_1$ to $DC5\lambda_4$ of the wavelengths at a position (refer to $C_5$ of FIG. 14) at which an add/drop multiplexing process is performed in the repeating apparatus 30-5 exhibits a cumulative increase when compared with the dispersion of the residual dispersion amounts $DC1\lambda_1$ to $DC1\lambda_{44}$ at another position (refer to $C_1$ of FIG. 14) at which an add/drop multiplexing process is performed in the repeating apparatus 30-1.

Figure 15:
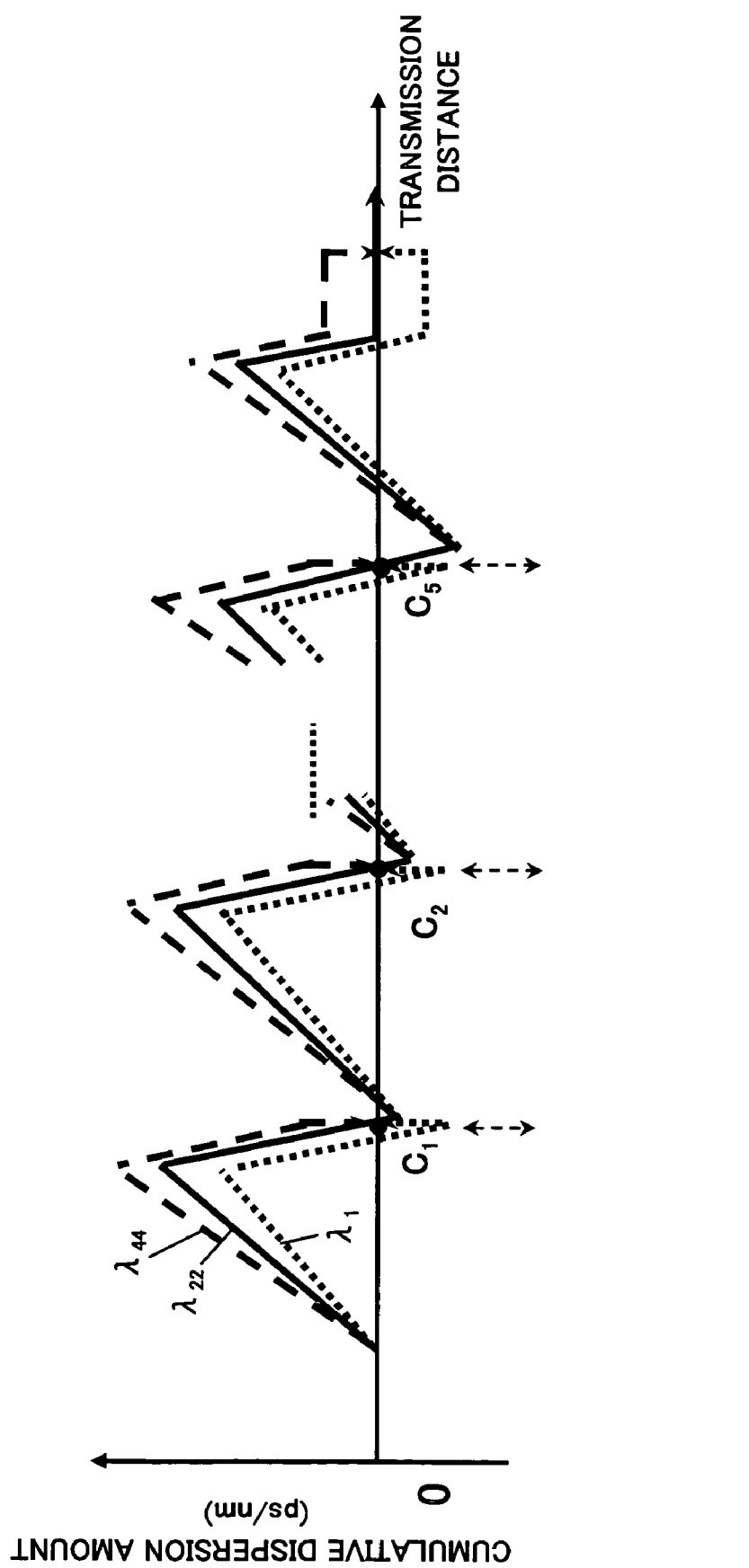
FIG. 15 is a diagrammatic view illustrating another mode of dispersion compensation of the wavelength division multiplexing optical repeating transmission system shown in FIG. 13.

The variable dispersion slope compensator 37 in the repeating apparatus 30-1 to 30-5 in the present modification is provided to compensate for such a dispersion slope as described above at the individual repeating stages and compensates for the dispersion slope of a wavelength division multiplexed optical signal after the dispersion compensation process by the first dispersion compensator 32 to make the dispersion amounts of the wavelengths $\lambda_1$ to $\lambda_{44}$ equal to the dispersion amount (point at which the dispersion amount is zero, refer to points $C_1$ to $C_5$ of FIG. 15) of the wavelength $\lambda_{22}$. Consequently, the residual dispersion slope can be prevented from increasing cumulatively as the transmission distance increases.

In the repeating apparatus 30-1 to 30-5 having the configuration described above, where a residual dispersion appears in an optical signal of each wavelength before and after the optical add/insertion multiplexing in the optical add/drop multiplexing process at the optical add/drop multiplexing step (by the optical demultiplexer 33 and the optical multiplexer 34 shown in FIG. 2), the residual dispersion is compensated for by the variable dispersion slope compensator 37 (residual dispersion compensation step).

More particularly, the residual dispersion slope of a wavelength division multiplexed optical signal having been compensated for with a dispersion amount with which the dispersion amount of the intermediate wavelength $\lambda_{22}$ is reduced to zero by the first dispersion compensator 32 (first dispersion compensation step) of the repeating apparatus 30-1 to 30-5 is compensated for by the variable dispersion slope compensator 37 (residual dispersion compensation step).

The wavelength division multiplexed optical signal having the residual dispersion slope compensated for in this manner is signaled to the repeating interval 40-2 to 40-6 in the following stage after it is subject to the optical add/drop multiplexing process by the optical demultiplexer 33 and the optical multiplexer 34, the second dispersion compensation process by the second dispersion compensator 35 and the amplification process by the amplifier 36.

In this manner, according to the second modification to the first embodiment of the present invention, the residual dispersion slope of a wavelength division multiplexed optical signal having been compensated for with a dispersion amount with which the dispersion amount of the intermediate wavelength $\lambda_{22}$ is reduced to zero at the first dispersion compensation step can be compensated for by the variable dispersion slope compensator 37 at the residual dispersion compensation step. Consequently, the residual dispersion slope can be prevented from increasing cumulatively as the transmission distance increases.

Further, since the predetermined proportion R for performing the dispersion compensation process with an over compensation amount in the second dispersion compensator 35 (at the second dispersion compensation step) can be set so as to gradually increase together with the transmission distance from the terminal apparatus 10 for transmission on the optical transmission line 40 to the repeating apparatus 30-1 to 30-(N−1).

It is to be noted that, while, in FIG. 13, the variable dispersion slope compensator 37 is used for compensation of the residual dispersion slope, according to the present invention, the method of the compensation is not limited to this, but a number of different fixed dispersion slope compensators of different slope values are prepared such that a fixed dispersion slope compensator suitable for a dispersion slope residual amount measured actually in each of the repeating intervals 40-1 to 40-5 is used for the repeating section.

Further, as occasion demands, such a dispersion slope compensation as described above may be provided not at a position following the first dispersion compensator 32 (for example, the position A of the repeating apparatus 30-1 in FIG. 13) but at another position (C) preceding to the second dispersion compensator 35 or at a further position (D) following the second dispersion compensator 35. Further, the dispersion compensators at the positions (A to D) described above may be disposed in a suitable combination.

[D] Third Modification to the First Embodiment

Figure 16:
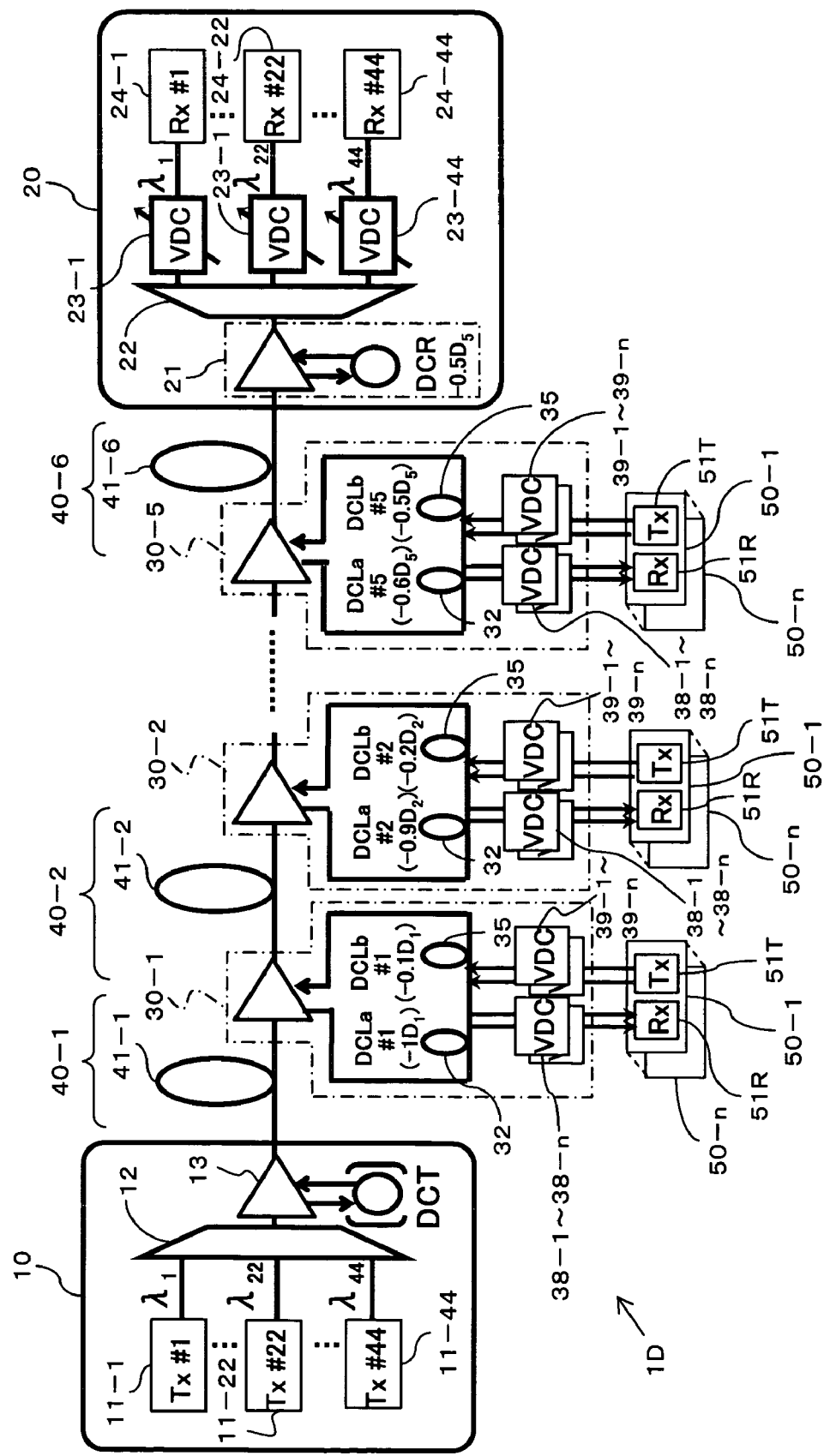
FIG. 16 is a block diagram showing a wavelength division multiplexing optical repeating transmission system according to a third modification to the first embodiment of the present invention.

FIG. 16 is a block diagram showing a wavelength division multiplexing optical repeating transmission system 1D according to a third modification to the first embodiment of the present invention. Referring to FIG. 16, the wavelength division multiplexing optical repeating transmission system 1D shown is different from the wavelength division multiplexing optical repeating transmission system 1A described hereinabove with reference to FIG. 1 in that the repeating apparatus 30-1 to 30-5 include, in addition to the components shown in FIG. 2, variable dispersion compensators 38-1 to 38-n and 39-1 to 39-n.

In the configuration described hereinabove with reference to FIG. 5, the proportion between the dispersion compensation amounts of the first dispersion compensator 32 and the second dispersion compensator 35 is adjusted so that the residual dispersion appearing in the intermediate wavelength band $\lambda_{22}$ in each of the repeating apparatus 30-1 to 30-5 may be reduced to zero. In addition to the dispersion compensation processes by the first dispersion compensator 32 and the second dispersion compensator 35 described hereinabove, the variable dispersion compensators 38-1 to 38-n in the present modification compensate for the residual dispersion slopes of optical signals to be signaled to the local stations 50-1 to 50-n, respectively. Meanwhile, the variable dispersion compensators 39-1 to 39-n compensate for the residual dispersion slopes of optical signals to be added to the wavelength division multiplexed optical signal on the optical transmission line 40 from the local stations 50-1 to 50-n, respectively.

In each of the repeating apparatus 30-1 to 30-5 of the wavelength division multiplexing optical repeating transmission system 1D having the configuration described above, if a residual dispersion appears in an optical signal of an wavelength before and after the optical add/drop multiplexing (in this instance, after the optical drop multiplexing and before the optical add multiplexing) in the optical add/drop multiplexing process at the optical add/drop multiplexing step (by the optical demultiplexer 33 and the optical multiplexer 34 shown in FIG. 2), then the variable dispersion slope compensator 37 compensates for the residual dispersion (residual dispersion compensation step).

In particular, a wavelength division multiplexed optical signal which has been compensated for with a dispersion amount with which the dispersion amount of the intermediate wavelength $\lambda_{22}$ is reduced to zero by the first dispersion compensator 32 (first dispersion compensation step) of each of the repeating apparatus 30-1 to 30-5 is wavelength demultiplexed by the optical demultiplexer 33, and resulting optical signals having wavelengths allocated as reception wavelengths to the local stations 50-1 to 50-n are outputted to the variable dispersion compensators 38-1 to 38-n, respectively. The variable dispersion compensators 38-1 to 38-n compensate for the residual dispersion slopes of optical signals to be signaled to the local stations 50-1 to 50-n and then signal the optical signals of the pertaining wavelengths to the local stations 50-1 to 50-n, respectively.

On the other hand, optical signals from the local stations 50-1 to 50-n are inputted to the variable dispersion compensators 39-1 to 39-n, respectively, by which the residual dispersion slopes thereof are compensated for. Then, the optical add/drop multiplexing process is performed for the optical signals from the variable dispersion compensators 39-1 to 39-n by the optical multiplexer 34.

In this manner, according to the third modification to the first embodiment of the present invention, the residual dispersion slopes of optical signals to be added by the optical multiplexer 34 (to be added from the local stations 50-1 to 50-n) together with optical signals dropped by the optical demultiplexer 33 (to be signaled to the local stations 50-1 to 50-n) can be compensated for by the variable dispersion compensators 38-1 to 38-n and 39-1 to 39-n. Consequently, there is an advantage that the displacement of the dispersion amount between optical signals from the local stations 50-1 to 50-n can be adjusted together with the displacement of the dispersion amount between optical signals of the wavelengths to be signaled to the local stations 50-1 to 50-n.

Further, since the predetermined proportion R for performing the dispersion compensation process with an over compensation amount by the second dispersion compensator 35 (at the second dispersion compensation step) can be set so as to gradually increase together with the transmission distance of the terminal apparatus 10 for transmission on the optical transmission line 40 to the repeating apparatus 30-1 to 30-(N−1), advantages similar to those of the first embodiment described hereinabove can be achieved.

It is to be noted that, while it is necessary to provide the variable dispersion compensators 38-1 to 38-n and 39-1 to 39-n described above for the individual optical wavelengths allocated for transmission and reception to the local stations 50-1 to 50-n, since they are used to compensate for a comparatively small dispersion amount of a residual dispersion slope, they may have a small range for variation of the dispersion amount and therefore can be implemented using a less expensive and small-size device.

[E] Fourth Modification to the First Embodiment

Figure 17:
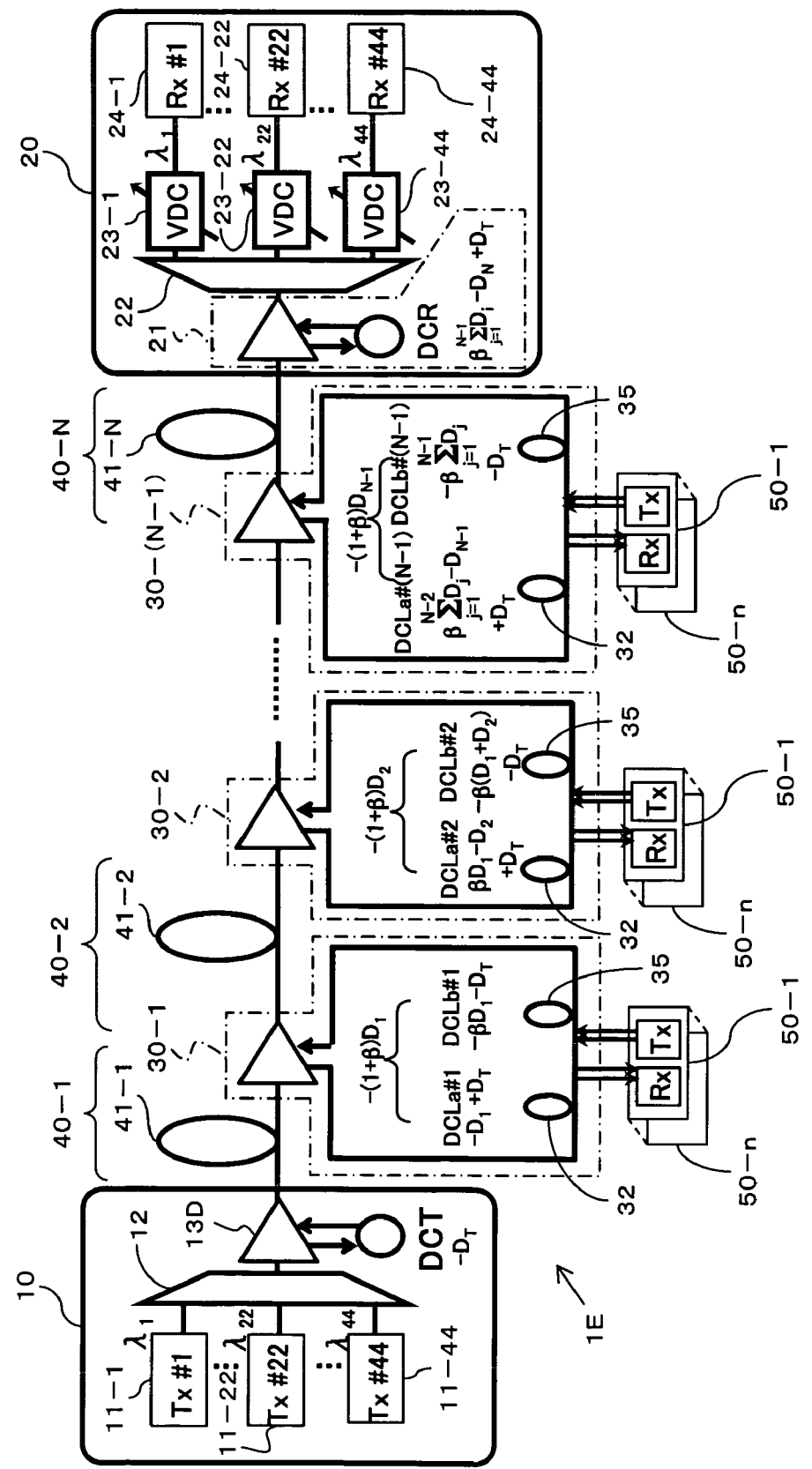
FIG. 17 is a block diagram showing a wavelength division multiplexing optical repeating transmission system according to a fourth modification to the first embodiment of the present invention.

FIG. 17 is a block diagram showing a wavelength division multiplexing optical repeating transmission system 1E according to a fourth modification to the first embodiment of the present invention. Referring to FIG. 17, the wavelength division multiplexing optical repeating transmission system 1E shown is different from the wavelength division multiplexing optical repeating transmission system 1A of the first embodiment described hereinabove in that the amplifier 13 of the terminal apparatus 10 for transmission is formed as a dispersion compensator/amplifier 13D and the dispersion compensation amount in the dispersion compensator/amplifier 13D is set in accordance with transmission conditions such as the type of the fiber, the transmission distance and the bit rate.

The configuration of the wavelength division multiplexing optical repeating transmission system 1E except the dispersion compensator/amplifier 13D described above is basically similar to that of the first embodiment described hereinabove.

Figure 18:
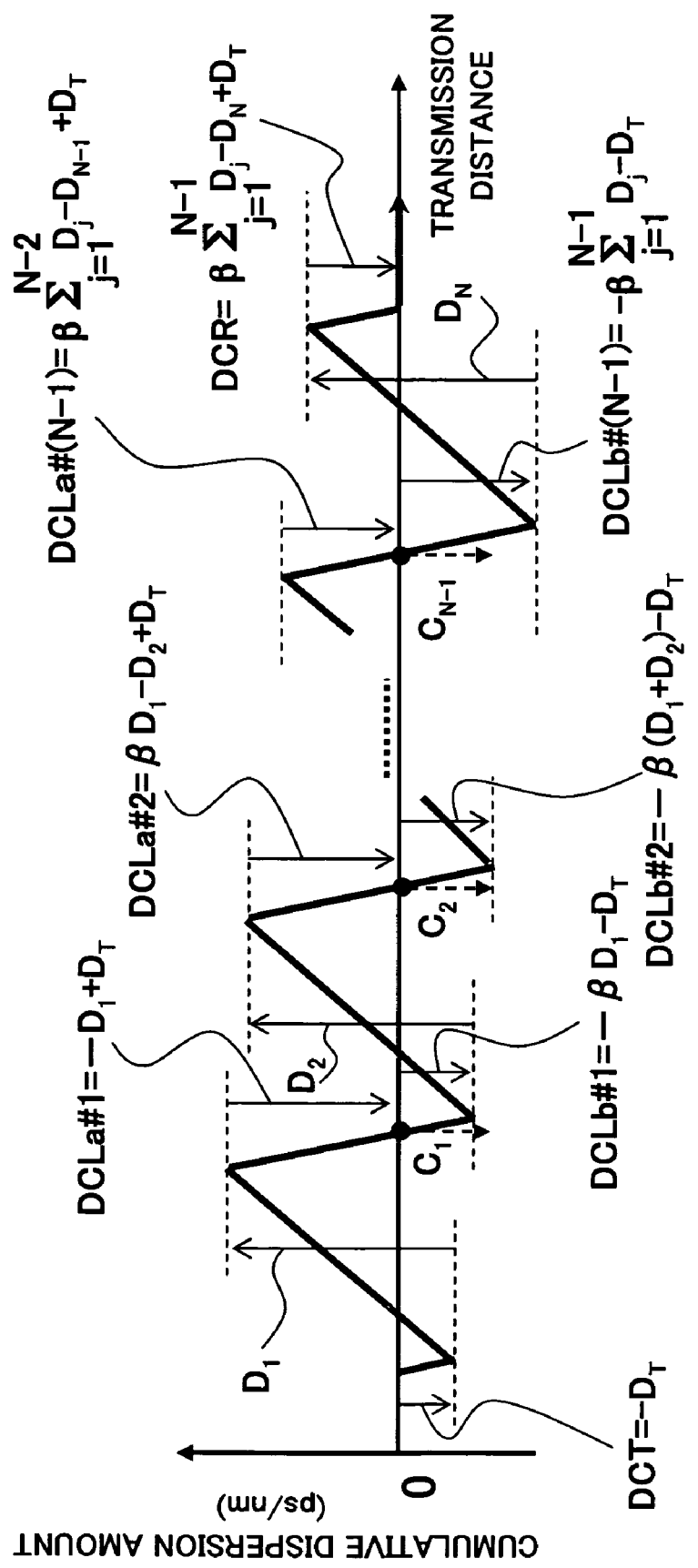
FIG. 18 is a diagrammatic view illustrating a mode of dispersion compensation of the wavelength division multiplexing optical repeating transmission system shown in FIG. 17.

In particular, the dispersion compensation amount DCT in the dispersion compensator/amplifier 13D is set to $-D_T$ as seen in FIG. 18, and consequently, the first dispersion compensator 32 in the repeating apparatus 30-1 to 30-(N−1) performs a dispersion compensation process with a compensation amount equal to a value obtained by adding $+D_T$ to the compensation amount (refer to the expression [3a]) used in the first embodiment described hereinabove. Similarly, the second dispersion compensator 35 performs a dispersion compensation process with an over compensation amount equal to a value obtained by adding $-D_T$ to the compensation amount (refer to the expression [3b]) used in the first embodiment described hereinabove.

Consequently, for an optical signal of the intermediate wavelength band $\lambda_{22}$, the residual dispersion at the position of a band dividing apparatus at the position of the optical demodulator 22 after the dispersion compensation by the dispersion compensator/optical amplifier 21 can be reduced to zero. Further, the terminal apparatus 10 for transmission and the terminal apparatus 20 for reception take charge of the compensation by the compensation amount DCR in the dispersion compensator/amplifier 21 of the terminal apparatus 20 for reception in the first embodiment described above in accordance with the transmission conditions such as the fiber type, transmission distance and bit rate.

Accordingly, also in the fourth modification to the first embodiment of the present invention, similar advantages to those of the first embodiment described hereinabove can be achieved. Further, since the terminal apparatus 10 for transmission and the terminal apparatus 20 for reception can take charge of the compensation by the compensation amount DCR in the dispersion compensator/optical amplifier 21 in the terminal apparatus 20 for reception in the first embodiment described hereinabove, the wavelength division multiplexing optical repeating transmission system 1E has an advantage that optimum dispersion compensation functions in accordance with transmission conditions can be disposed.

Also in the terminal apparatus 10 for transmission in the wavelength division multiplexing optical repeating transmission systems 1A, 1A' and 1B to 1D according to the first embodiment and the first to third modifications to the first embodiment described above, it is possible to apply the dispersion compensator/amplifier 13D with a dispersion compensation function to the amplifier 13 of the terminal apparatus 10 for transmission similarly as in the case of FIG. 17. In this instance, however, the dispersion compensation amount is set to zero.

Also it is naturally possible to modify the wavelength division multiplexing optical repeating transmission systems 1B to 1D according to the first to third modifications to the first embodiment described above such that the dispersion compensation amount in the dispersion compensator/amplifier 13D is set in accordance with transmission conditions such as the fiber type, transmission distance and bit rate.

[F] Second Embodiment

Figure 19:
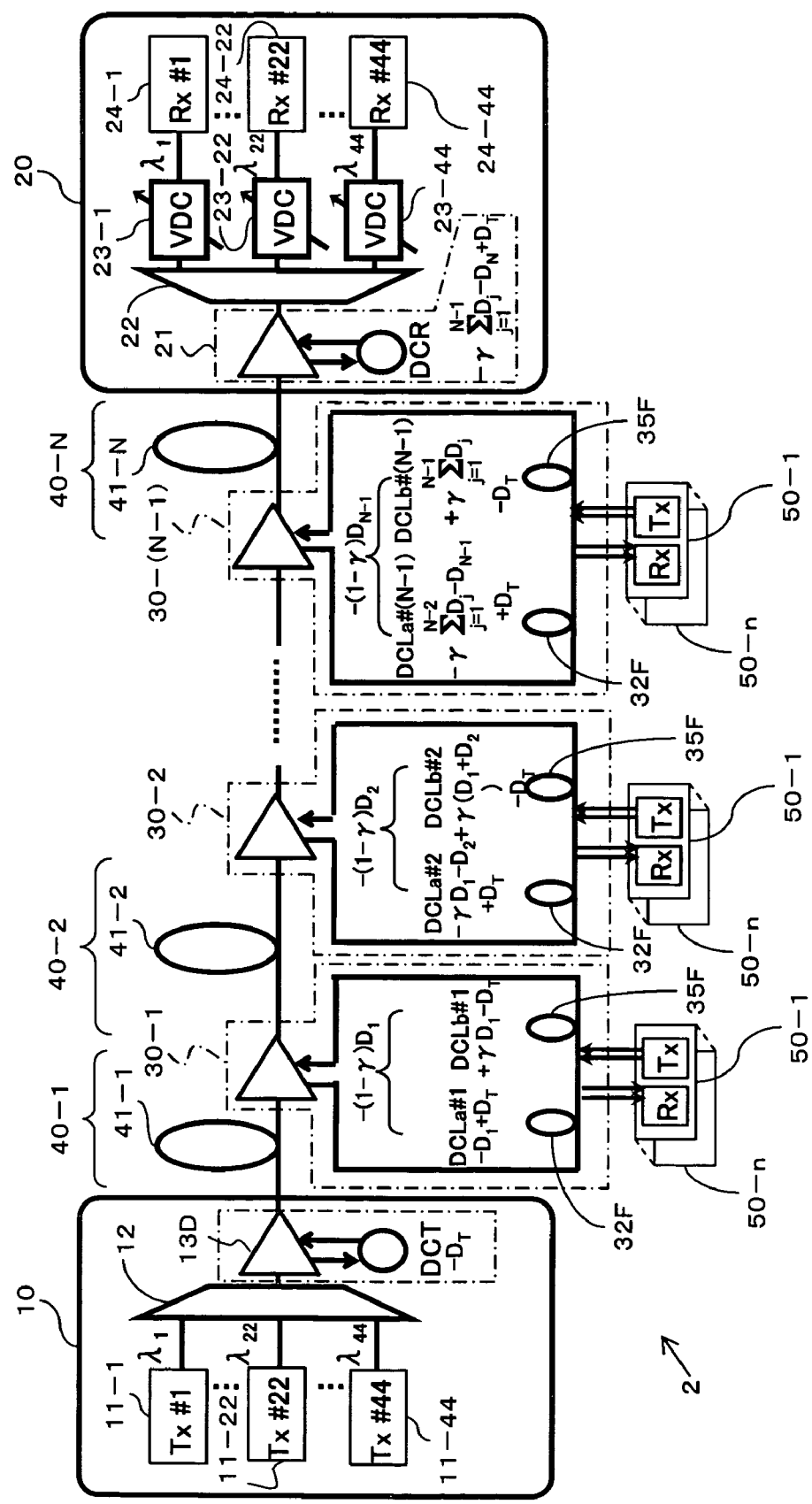
FIG. 19 is a block diagram showing a wavelength division multiplexing optical repeating transmission system according to a second embodiment of the present invention.

FIG. 19 is a block diagram showing a wavelength division multiplexing optical repeating transmission system 2 according to a second embodiment of the present invention. Referring to FIG. 19, the wavelength division multiplexing optical repeating transmission system 2 shown is different from the wavelength division multiplexing optical repeating transmission system 1A according to the first embodiment described hereinabove in that it includes a dispersion compensator/amplifier 13D similar to that described hereinabove with reference to FIG. 17. The wavelength division multiplexing optical repeating transmission system 2 is further different from the wavelength division multiplexing optical repeating transmission system 1A in a mode of dispersion compensation by a first dispersion compensator 32F and a second dispersion compensator 35F in the repeating apparatus 30-1 to 30-(N−1). It is to be noted that the wavelength division multiplexing optical repeating transmission system 2 has a basically similar configuration to that of the wavelength division multiplexing optical repeating transmission system 1A of the first embodiment described hereinabove except the dispersion compensator/amplifier 13D and the repeating apparatus 30-1 to 30-(N−1) described above.

In particular, the dispersion compensation amount DCT in the dispersion compensator/amplifier 13D is set to $-D_T$ and the first dispersion compensator 32F in each of the repeating apparatus 30-1 to 30-(N−1) compensates for the dispersion included in a wavelength division multiplexed optical signal propagated in the repeating interval 40-1 to 40-(N−1) on the terminal apparatus 10 side for transmission so as to be included within a tolerance set in advance (for example, so as to reduce the dispersion amount to zero).

Further, the second dispersion compensator 35F in each of the repeating apparatus 30-1 to 30-(N−1) performs a dispersion compensation process with an over compensation amount for a wavelength division multiplexed optical signal for which an optical add/drop multiplexing process has been performed by the optical demultiplexer 33 and the optical multiplexer 34 (refer to FIG. 2) so that the sum of the compensation amount in the first dispersion compensator 32F and the compensation amount in the second dispersion compensator 35F may exhibit a predetermined proportion to the sum total of the dispersion appearing in the repeating intervals. The predetermined proportion to be used for the dispersion compensation with the over compensation amount is set so as to gradually decrease together with the transmission distance from the terminal apparatus 10 for transmission to the position at which the repeating apparatus 30-1 to 30-(N−1) is disposed.

More particularly, where the dispersion amount appearing in an optical signal of the intermediate wavelength $\lambda_{22}$ in the repeating interval 40-1 is represented by $D_1$, the optimum dispersion compensation amount DCLa#1 in the first dispersion compensator 32F of the repeating apparatus 30-1 described above can be represented, for example, as an expression [6a] given below. Consequently, the first dispersion compensator 32 of the repeating apparatus 30-1 can suppress the chromatic dispersion appearing in the optical signal of the intermediate frequency $\lambda_{22}$ in the repeating interval 40-1 to zero (refer to a point $C_1$ of FIG. 20).

$$DCLa\#1 = -D_1 + D_T \quad [6a]$$

Meanwhile, the over compensation amount DCLb#1 in the second dispersion compensator 35F of the repeating apparatus 30-1 can be determined, for example, as a value obtained by adding, to the over compensation amount $-D_T$ in the dispersion compensator/amplifier 13D, a value obtained by multiplying the dispersion amount $D_1$ appearing in the intermediate wavelength $\lambda_{22}$ in the repeating interval 40-1 described above by a fixed non-compensation coefficient γ (the compensation coefficient is 1−γ) (refer to FIG. 20) as represented by an expression [6b].

$$DCLb\#1 = -D_T + (\gamma \times D_1) = +\gamma D_1 - D_T \quad [6b]$$

Further, where the dispersion amount caused to appear in an optical signal of the intermediate wavelength $\lambda_{22}$ by the repeating interval 40-2 is represented by $D_2$, the optimum dispersion compensation amount DCLa#2 in the first dispersion compensator 32F of the repeating apparatus 30-2 described above can be represented, for example, as an expression [7a] given below.

In particular, since the dispersion amount of the optical signal of the intermediate wavelength $\lambda_{22}$ at a point of time when the optical signal is signaled from the repeating apparatus 30-1 to the repeating interval 40-2 is a value indicated by the expression [6b], the dispersion amount to be compensated for by the first dispersion compensator 32F of the repeating apparatus 30-2 is a value obtained by adding the dispersion amount $D_2$ to the value indicated by the expression [6b] (refer to FIG. 3). It is to be noted that an actual compensation amount is obtained by converting the value of the dispersion amount into a negative value.

$$DCLa\#2 = -(+\gamma D_1 - D_T + D_2) = -\gamma D_1 - D_2 + D_T \quad [7a]$$

Further, the over compensation amount DCLb#1 in the second dispersion compensator 35F of the repeating apparatus 30-2 can be determined, for example, as a value obtained by adding, to the over compensation amount $-D_T$ in the dispersion compensator/amplifier 13D, a value obtained by multiplying the cumulative dispersion amount $D_1 + D_2$ appearing in the two repeating intervals 40-1 and 40-2 described above by the fixed non-compensation coefficient γ (refer to FIG. 20) as represented by an expression [7b].

$$DCLb\#2 = -D_T + \gamma(D_1 + D_2) \quad [7b]$$

Also the first dispersion compensator 32F and the second dispersion compensator 35F in the repeating apparatus 30-3 to 30-(N−1) can calculate similarly to those in the repeating apparatus 30-1 and 30-2 described above.

An expression [8a] indicates the optimum dispersion compensation amount DCLa#i to be used for compensation by the first dispersion compensator 32F in the repeating apparatus 30-i [i; 2 to N−1]. With the compensation amount DCLa#i, the first dispersion compensator 32F in each of the repeating apparatus 30-2 to 30-(N−1) can reduce the chromatic dispersion appearing in an optical signal of the intermediate wavelength $\lambda_{22}$ in the repeating intervals 40-2 to 40-(N−1) in the preceding stage to zero (refer to points $C_2$ to $C_{n-1}$ of FIG. 20).

Figure 20:
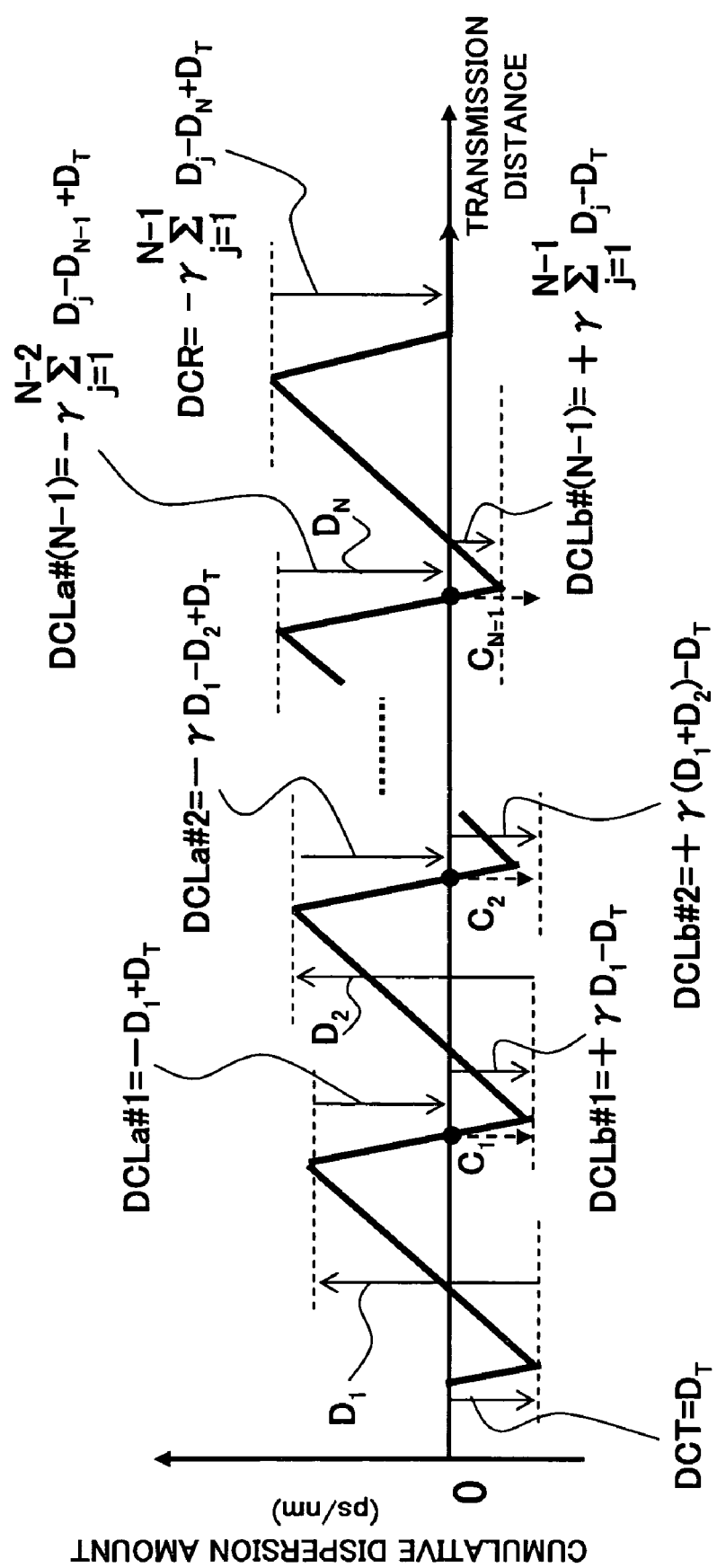
FIG. 20 is a diagrammatic view illustrating a mode of dispersion compensation of the wavelength division multiplexing optical repeating transmission system shown in FIG. 19.

Meanwhile, another expression [8b] indicates the over compensation amount DCLb#i to be used for compensation in the second dispersion compensator 35F in the repeating apparatus 30-i [i; 2 to N−1] (refer to FIG. 20).

$$DCLa\#i = -\gamma \sum_{j=1}^{i-1} D_j - D_i + D_T \quad [8a]$$

$$DCLb\#i = +\gamma \sum_{j=1}^{i} D_j - D_T \quad [8b]$$

In particular, the optimum dispersion compensation amount DCLa#i in the first dispersion compensator 32F can be derived using the dispersion $D_i$ appearing in the intermediate frequency $\lambda_{22}$ of a wavelength division multiplexed optical signal propagated through the repeating interval 40-(i−1) and the cumulative value of the over compensation amounts in the repeating intervals 40-1 to 40-(i−1). Further, from the expression [8b] given above, the magnitude of the over compensation amount decreases (the absolute value of the value of the expression [8b] decreases) as the transmission distance from the terminal apparatus 10 for transmission increases.

Further, the proportion $R_1$ of the dispersion compensation value in the second dispersion compensator 35F to the sum of the dispersion compensation values in the first dispersion compensator 32F and the second dispersion compensator 35F in the repeating apparatus 30-1 described above is given by an expression [9-1]. Further, the proportion $R_i$ of the dispersion compensation value of the second dispersion compensator 35F to the sum of the dispersion compensation values of the first dispersion compensator 32F and the second dispersion compensator 35F in the repeating apparatus 30-i is given by another expression [9-i] using results of the expression [8a] and the expression [8b]. It is to be noted that the expression [9-i] applies also where i=1 (that is, $R_1$).

$$R_1 = \frac{\gamma D_1 - D_T}{-D_1 + D_T + \gamma D_1 - D_T} = \frac{\gamma D_1 - D_T}{D_1(\gamma - 1)} \quad [9\text{-}1]$$

$$R_i = \frac{\gamma \sum_{j=1}^{i} D_j - D_T}{-\gamma \sum_{j=1}^{i-1} D_j - D_i + D_T + \gamma \sum_{j=1}^{i} D_j - D_T} = \frac{\gamma \sum_{j=1}^{i} D_j - D_T}{D_i(\gamma - 1)} \quad [9\text{-}i]$$

Here, if it is assumed that each of the repeating intervals 40-1 to 40-(N−1) is formed from a single mode fiber (SMF) of approximately 100 km, then the transmission line dispersion amounts of the repeating intervals 40-1 to 40-(N−1) can be set to dispersion amounts D substantially equal to each other. In this instance, the expression [9-i] given above can be represented as in the following expression [9'].

$$R_i = \frac{\gamma \sum_{j=1}^{i} D_j - D_T}{D_i(\gamma - 1)} = \frac{\gamma \times i}{1 - \gamma} + \frac{D_T}{D(1 - \gamma)} \quad [9']$$

Here, the preceding term of the expression [9'] has a negative value which decreases as the position at which the repeating apparatus 30-i is disposed is spaced away by an increased distance from the terminal apparatus 10 for transmission while the succeeding term has a fixed positive value. In other words, the proportion $R_i$ of the over compensation amount in the second dispersion compensator 35F to the sum of the dispersion compensation amounts in the first dispersion compensator 32F and the second dispersion compensator 35F is set so as to gradually vary (gradually decrease) as the position at which the repeating apparatus 30-i is disposed is spaced away by an increased distance from the terminal apparatus 10 for transmission, that is, as the transmission distance of the repeating apparatus 30-i from the terminal apparatus 10 for transmission increases.

Also in the wavelength division multiplexing optical repeating transmission system 2 according to the second embodiment of the present invention having the configuration described above, similarly as in the first embodiment, the first dispersion compensator 32F optimally compensates for the dispersion included in a wavelength division multiplexed optical signal propagated through the repeating interval 30-1 to 30-(N−1) on the terminal apparatus 10 side for transmission so as to be included within the tolerance set in advance (first dispersion compensation step), and the proportion R (refer to the expression [9']) for performing the dispersion compensation process with the over compensation amount by the second dispersion compensator 35F (at the second dispersion compensation step) is set so as to gradually decrease as the location of the repeating apparatus 30-1 to 30-(N−1) is spaced by an increased distance away from the terminal apparatus 10 for transmission on the optical transmission line 40.

Accordingly, according to the second embodiment of the present invention, after the first dispersion compensator 32F optimally compensates for the dispersion included in a wavelength division multiplexed optical signal propagated through the repeating interval 30-1 to 30-(N−1) on the terminal apparatus 10 side for transmission so as to be included within the tolerance set in advance (first dispersion compensation step), an optical add/drop multiplexing process can be performed by the optical demultiplexer 33 and the optical multiplexer 34 (refer to FIG. 2) (optical add/drop multiplexing step). Therefore, the chromatic dispersion of optical signals to be received by the local stations 50-1 to 50-n can be optimally compensated for to improve the characteristic of the reception optical signals. Further, the proportion R of the over compensation amount at the second dispersion compensation step to the sum of the dispersion compensation amounts at the first and second dispersion compensation steps can be set so as to gradually decrease together with the transmission distance from the terminal apparatus for transmission on the optical transmission line to the repeating apparatus. Consequently, the waveform degradation of the optical signals of the wavelengths to be received by the terminal apparatus 20 for reception can be optimally compensated for.

Also in the terminal apparatus 10 for transmission in the wavelength division multiplexing optical repeating transmission systems 1B to 1D according to the first to third modifications to the first embodiment described above, it is naturally possible to set the predetermined proportion R for performing the dispersion compensation process with an over compensation amount at the second dispersion compensation step so as to gradually decrease together with the transmission distance from the value $-D_T$ for the over compensation by the terminal apparatus 10 for transmission similarly as in the case of FIG. 19.

[G] Others

In the embodiments described above, the repeating apparatus 30-1 to 30-(N−1) described in detail above are configured such that the amplifiers 31 and 36 and the dispersion compensators 32 and 35 are formed separately from each other as seen in FIG. 2, according to the present invention, the configuration of the repeating apparatus 30-1 to 30-(N−1) is not limited to this, but, for example, the amplifier 31 and the first dispersion compensator 32 or the amplifier 36 and the second dispersion compensator 35 may be formed as a single circuit.

The present invention is not limited to the embodiment specifically described above, and variations and modifications can be made without departing from the scope of the present invention.

What is claimed is:

1. A wavelength division multiplexing optical transmission method for repeating transmission of a wavelength multiplexed optical signal along an optical transmission line interconnecting a terminal apparatus for transmission and a terminal apparatus for reception and having a plurality of divisional intervals into which the optical transmission line is divided by a plurality of apparatuses, comprising steps executed by each of said apparatuses disposed at end points of the divisional intervals, the steps including:

a first dispersion compensation step of compensating for a dispersion included in the wavelength multiplexed optical signal having propagated in the divisional repeating interval on the terminal apparatus side for transmission so that a remaining dispersion amount is within a tolerance set in advance;

an optical add/drop multiplexing step of performing an optical add/drop multiplexing for each of wavelength components of the wavelength multiplexed optical signal for which the dispersion compensation has been performed at the first dispersion compensation step;

a second dispersion compensation step of performing a dispersion compensation with an additional compensation amount to the compensation amount of the first dispersion compensation step for the wavelength multiplexed optical signal for which the optical add/drop multiplexing has been performed at the optical add/drop multiplexing step, said additional compensation amount is from 5 to 20 percent of a total dispersion amount occurred in the divisional repeating intervals on the terminal apparatus side for transmission;

a ratio of the additional compensation amount at the second dispersion compensation step to the sum of the dispersion compensation amounts at the first and second dispersion compensation steps being set so as to gradually increase with the transmission distance between said terminal apparatus for transmission and a corresponding one of said apparatuses; and a third dispersion compensation step of performing a dispersion compensation with additional compensation amounts to dispersions at optical reception sections each of which performs a reception process for one of demultiplexed optical signals whose dispersion values of the wavelengths have been optimally compensated for by fine-tunable variable dispersion compensators respectively.

2. The wavelength division multiplexing optical transmission method as claimed in claim 1, further comprising a residual dispersion compensation step executed by each of said apparatuses of compensating, where a residual dispersion appears in an optical signal of each wavelength before and after the optical add/drop multiplexing process at the optical add/drop multiplexing step, for the residual dispersion.

3. The wavelength division multiplexing optical transmission method as claimed in claim 1, further comprising a transmission side dispersion compensation step of performing a dispersion compensation which satisfies a transmission condition for a wavelength multiplexed optical signal to be transmitted in said terminal apparatus for transmission.

4. The wavelength division multiplexing optical transmission method as claimed in claim 3, wherein the transmission condition relates to at least one of the kind of fiber, the transmission distance and the bit rate.

5. An apparatus for a wavelength division multiplexing optical transmission system having a terminal apparatus for transmission and a terminal apparatus for reception interconnected by an optical transmission line having a plurality of divisional intervals into which the optical transmission line is divided by a plurality of apparatuses to perform transmission of a wavelength multiplexed optical signal, comprising:

a first dispersion compensation section compensating for a dispersion included in the wavelength multiplexed optical signal having propagated in the divisional interval on the terminal apparatus side for transmission so that a remaining dispersion amount is within a tolerance set in advance;

an optical add/drop multiplexing section performing an optical add/drop multiplexing process for each of wavelength components of the wavelength multiplexed optical signal for which the dispersion compensation has been performed in said first dispersion compensation section;

a second dispersion compensation section performing a dispersion compensation with an additional compensation amount to the compensation amount of said first dispersion compensation section for the wavelength multiplexed optical signal for which the optical add/drop multiplexing has been performed by said optical add/drop multiplexing section, said additional compensation amount is from 5 to 20 percent of a total dispersion amount occurred in the divisional intervals on the terminal apparatus side for transmission, wherein said second dispersion compensation section sets the additional compensation amount so that a ratio of the additional compensation amount to a sum of the dispersion compensation amounts of said first and second dispersion compensation sections gradually increases with a transmission distance between said terminal apparatus for transmission and said apparatus; and a third dispersion compensation section for performing a dispersion compensation with additional compensation amounts to dispersions at optical reception sections each of which performs a reception process for one of demultiplexed optical signals whose dispersion values of the wavelengths have been optimally compensated for by fine-tunable variable dispersion compensators respectively.

6. The apparatus as claimed in claim 5, wherein at least one of said first and second dispersion compensation sections is formed from a variable dispersion compensation apparatus which can vary a set value for a dispersion compensation amount.

7. The apparatus as claimed in claim 5, further comprising:
a dispersion slope compensation device compensating for a dispersion slope regarding a wavelength multiplexed optical signal to be inputted to said optical add/drop multiplexing section or a wavelength multiplexed optical signal outputted from said optical add/drop multiplexing section of a different one of the plural apparatus.

8. The apparatus as claimed in claim 5, further comprising:
a dispersion compensator compensating for a residual dispersion amount with respect to a dispersion compensation amount in said first or second dispersion compensation section for each optical signal of an individual channel added/dropped by said optical add/drop multiplexing section.

9. A wavelength division multiplexing optical transmission method by apparatuses disposed at end points of a plurality of divisional intervals for performing transmission of a wavelength multiplexed optical signal along an optical transmission line interconnecting a terminal apparatus for transmission and a terminal apparatus for reception and having the plurality of divisional intervals into which the optical transmission line is divided by a plurality of apparatuses, the method comprising:
performing a first dispersion compensation compensating for a dispersion included in the wavelength multiplexed optical signal having propagated in the divisional interval on the terminal apparatus side for transmission so that a remaining dispersion amount is within a tolerance set in advance;
performing an optical add/drop multiplexing for each of wavelength components of the wavelength multiplexed optical signal for which the dispersion compensation has been performed at the first dispersion compensation; and
performing a second dispersion compensation using a dispersion compensation having an additional compensation amount to the compensation amount of the first dispersion compensation for the wavelength multiplexed optical signal for which the optical add/drop multiplexing has been performed,
wherein said additional compensation amount is from 5 to 20 percent of a total dispersion amount occurred in the divisional intervals on the terminal apparatus side for transmission, and
a ratio of the additional compensation amount to a sum of dispersion compensation amounts at the first and second dispersion compensation steps gradually increasing with a transmission distance between said terminal apparatus for transmission and a corresponding one of said apparatuses; and
performing a third dispersion compensation using a dispersion compensation having additional compensation amounts to dispersions at optical reception sections each of which performs a reception process for one of demultiplexed optical signals whose dispersion values of the wavelengths have been optimally compensated for by fine-tunable variable dispersion compensators respectively.

* * * * *